US012277832B2

(12) United States Patent
Anonychuk

(10) Patent No.: US 12,277,832 B2
(45) Date of Patent: Apr. 15, 2025

(54) SYSTEMS, METHODS AND DEVICES FOR ENABLING REMOTE PARTICIPATION IN LIVE IN-PERSON GAMES

(71) Applicant: 15399769 CANADA INC., Cornwall (CA)

(72) Inventor: Lawrence Herbert Anonychuk, Cornwall (CA)

(73) Assignee: 15399769 CANADA INC., Cornwall (CA)

( * ) Notice: Subject to any disclaimer, the term of this patent is extended or adjusted under 35 U.S.C. 154(b) by 0 days.

(21) Appl. No.: 18/885,022

(22) Filed: Sep. 13, 2024

(65) Prior Publication Data

US 2025/0005998 A1 Jan. 2, 2025

Related U.S. Application Data

(63) Continuation of application No. PCT/CA2023/051643, filed on Dec. 12, 2023.

(60) Provisional application No. 63/433,073, filed on Dec. 16, 2022.

(51) Int. Cl.
*G07F 17/32* (2006.01)

(52) U.S. Cl.
CPC ...... *G07F 17/3225* (2013.01); *G07F 17/3237* (2013.01); *G07F 17/3241* (2013.01); *G07F 17/3276* (2013.01)

(58) Field of Classification Search
CPC ............. G07F 17/3225; G07F 17/3237; G07F 17/3241; G07F 17/3276
USPC ...................................................... 463/25, 42
See application file for complete search history.

(56) References Cited

U.S. PATENT DOCUMENTS 9,336,644 B2 5/2016 Graf et al.
9,892,589 B2 2/2018 Lyons
11,217,083 B1 1/2022 Luo
2003/0195043 A1* 10/2003 Shinners ................. G07F 17/32 463/42
2007/0232397 A1 10/2007 Katz
2010/0279776 A1* 11/2010 Hall ........................ H04W 4/02 463/42
2012/0149463 A1 6/2012 Jabara et al.
2013/0079152 A1* 3/2013 Hall ...................... H04W 4/027 463/42

(Continued)

FOREIGN PATENT DOCUMENTS

EP 3799467 A1 3/2021

OTHER PUBLICATIONS

International Search Report & Written Opinion mailed Apr. 16, 2024 in PCT/CA2023/051643.

*Primary Examiner* — Pierre E Elisca

(57) ABSTRACT

Systems, methods and devices for enabling remote players to participate in live games alongside in-person participants. A proxy device can be positioned at a gaming location where a live in-person game is taking place. The proxy device communicates with a user device of a corresponding user. The user receives feedback data from the proxy device relating to the game. The user controls the operation of the proxy device through their user device. The proxy device thus participates in the live game on behalf of the user. This can allow a user to enjoy the entire gaming experience of participating in a live game alongside other participants and/or venue employees even while they are not actually present at the game location.

20 Claims, 16 Drawing Sheets

(56) References Cited

U.S. PATENT DOCUMENTS

| | | | | |
|---|---|---|---|---|
| 2020/0360821 | A1* | 11/2020 | Weaver | G07F 17/329 |
| 2020/0364987 | A1* | 11/2020 | Weaver | G07F 17/3225 |
| 2022/0392312 | A1* | 12/2022 | Marks | G07F 17/3267 |

* cited by examiner

SYSTEMS, METHODS AND DEVICES FOR ENABLING REMOTE PARTICIPATION IN LIVE IN-PERSON GAMES

CROSS-REFERENCE TO RELATED APPLICATION

This application is a continuation of PCT/CA2023/051643, filed Dec. 12, 2023, which claims priority from U.S. Provisional Patent Application Ser. No. 63/433,073, filed Dec. 16, 2022, the entire contents of which are hereby incorporated by reference.

FIELD

The specification relates generally to in-person gaming, and in particular systems, methods and devices for enabling remote players to participate in live games alongside in-person participants.

INTRODUCTION

The following is not an admission that anything discussed below is part of the prior art or part of the common general knowledge of a person skilled in the art.

In-person gaming venues allow individuals to participate in a variety of games with other players, including individuals they may not know. In-person games are often a social experience that heightens the enjoyment of the game and encourages individuals to continue participating. However, some aspects of in-person games are less desirable, including unwanted social interactions such as heckling or harassment and health-related aspects such as the potential to encounter smoking or communicable diseases.

Players also form attachments to specific venues, game tables, slot machines, or even specific employees within a venue based on their impressions or experiences at these venues. However, travelling to specific venues can become a time-intensive and costly endeavor depending on the distance from the player's location.

Venues such as casinos provide infrastructure and personnel to facilitate and support these in-person games. Venue operators often want to maximize participation in the ongoing games in order to maximize the revenue they can achieve. However, it can be challenging to maintain a consistently high number of players for all but the most popular of venues.

SUMMARY

The following introduction is provided to introduce the reader to the more detailed discussion to follow. The introduction is not intended to limit or define any claimed or as yet unclaimed invention. One or more inventions may reside in any combination or sub-combination of the elements or process steps disclosed in any part of this document including its claims and figures.

The present application provides systems, methods and devices for enabling remote players to participate in live games alongside in-person participants.

A proxy device can be positioned at a gaming location where a live in-person game is taking place. The proxy device is operable to communicate with a user device of a corresponding user. The user can receive feedback data from the proxy device relating to the game. The user can control the operation of the proxy device through their user device. The proxy device can thus participate in the live game on behalf of the user. This can allow a user to enjoy the entire gaming experience of participating in a live game alongside other participants and/or venue employees even while they are not actually present at the game location.

In an aspect of this disclosure, there is provided a system for enabling remote participation in a live in-person game occurring at a game venue, the system comprising: a proxy device located at the game venue; and one or more servers communicatively coupled to the proxy device and to a user device; wherein the proxy device is positionable at a gaming location within the game venue; the one or more servers is configured to: receive control data from the user device; transmit the control data to the proxy device; and the proxy device is configured to participate in the game at the gaming location in response to the control data thereby enabling a user associated with the user device to participate in the game.

The control data may include wager data, and the proxy device can be configured to make a wager in the game in response to the wager data.

The proxy device can be configured to: acquire game data relating to a status of the game; and transmit the game data to the one or more servers; and the one or more servers can be configured to transmit the game data to the user device, where the game data is usable by the user device to generate a status output representative of the status of the game.

The game data can include user-specific data not visible to any other players participating in the game.

The game data can include participant wager data for one or more live players participating live in the game at the game venue.

The game data can include dealer data representing an instruction provided by the dealer of the game.

The proxy device can be configured to identify a specified action performed by the dealer of the game; and generate the dealer data automatically in response to identifying the specified action.

The specified action may correspond to a no more bets indication, and the one or more servers can be configured to prevent the user from submitting any further wagers in response to identifying the no more bets indication.

The proxy device can be configured to: acquire environment data relating to an environment of the game venue; and transmit the environment data to the one or more servers; and the one or more servers can be configured to transmit the environment data to the user device, where the environment data is usable by the user device to generate an environment output representative of the environment of the game venue.

The user device may be operable to mute at least some of the environment data acquired by the proxy device.

The one or more servers can be configured to: receive additional wager data from an additional user device, the additional user device corresponding to an additional user; and transmit the additional wager data to the proxy device; and the proxy device can be configured to make an additional piggyback wager in the game in response to the additional wager data thereby enabling the additional user to participate in the game by piggybacking on the participation of the user device.

The one or more servers can be configured to: receive auto-bet data from the user device; and transmit the auto-bet data to the proxy device; and the proxy device can be configured to make a plurality of automated wagers in the game in response to the auto-bet data.

The auto-bet data defines a user-specified set of wagering rules, and the proxy device can be configured to make the automated wagers according to the user-specified set of wagering rules in the absence of additional instructions.

The user device can be located at the game venue.

The user device can be located at a remote user location that is external to the game venue.

The game venue can be a casino, and the game can be a casino game.

The proxy device and the one or more servers can communicate over a local private network.

The one or more servers and the user device can communicate over the local private network.

The one or more servers and the user device can communicate at least partially using a public network.

The one or more servers can be configured to authenticate the user prior to enabling the user device to control the proxy device to participate in the game.

The one or more servers can be configured to continually authenticate the user while the game is ongoing to enable the user device to continue to control the proxy device.

The system can include at least one table output unit located at the gaming location, wherein the at least one table output unit is operable to display user wager data based on data received from the proxy device in response to the control data.

In an aspect of this disclosure, there is provided a device for enabling remote participation in live in-person games occurring at a game venue, the device comprising: a base positionable at a gaming location for a particular game within the game venue; at least one input unit mounted to the base, the at least one input unit including a video capture device, the at least one input unit positionable to acquire game status data relating to a playing environment of the particular game; at least one output unit mounted to the base, the at least output unit positionable to engage with the playing environment of the particular game; a communication interface; and one or more processors; wherein the one or more processors is configured to: acquire game data relating to a status of the particular game using the at least one input unit; and transmit the game data to a user device via the communication interface; receive control data from the user device via the communication interface, wherein the control data comprises wager data for the particular game occurring within the game venue; and operate the at least one output unit to place a wager in the particular game using the wager data.

The at least one output unit can include a speaker, and the one or more processors can be configured to output an audio wager for the game through the speaker in response to the control data.

The at least one output unit can include a display, and the one or more processors can be configured to display a wager for the game on the display in response to the control data.

The at least one output unit can include a projector, and the one or more processors can be configured to project a wager for the game onto a playing surface of the game in response to the control data.

The at least one output unit can include a display, and the one or more processors can be configured to display a user representation on the display while the game is ongoing.

The user representation can be defined based on video data showing the user acquired from the user device while the game is ongoing.

The user representation can be generated as an avatar representing the user.

The device can be positionable at a plurality of gaming locations within the game venue.

The base can be a movable base.

The base can be wheeled.

The device can include one or more track members, the track members can be mateable with a track, and the device can be movable along the track.

The communication interface can include a wireless communication unit.

The communication interface can include at least one wired communication connection.

The device can include a lock usable to secure the device to a particular gaming location.

The lock may be mateable with a corresponding lock receiving member at the particular gaming location.

The at least one input unit can be height adjustable.

The at least one output unit can be height adjustable.

The device can be adjustable to a compact storage position.

The at least one output unit can include at least one game-specific interaction unit configured to enable participation with a specified game.

The at least one game-specific interaction unit can include a plurality of game-specific interaction units, and the device may be operable to adjust between the game-specific interaction units to enable the device to participate in different games.

At least one of the game-specific interaction units may be removable.

The device can include a chip enclosure shaped to receive one or more casino chips where the chip enclosure is secured to prevent unauthorized access to the casino chips.

The device can include a funds transfer unit operable to receive funds from a user, wherein the funds comprise at one of a cash deposit, a card-based deposit using a credit or debit card, or a device-based deposit using an electronic device associated with the user.

The device can include a funds transfer unit operable to receive funds related to the outcome of the game and to electronically transfer the received funds into an account associated with the user following completion of the user's participation in the game.

The device can further include a device for handling casino chips.

The at least one output unit can include at least one touch-sensitive element operable to interact with a touch-sensitive input surface.

The device can include a cash dispensing unit.

In an aspect of this disclosure, there is provided a device for facilitating remote participation in a card game, the device comprising: a bottom wall and at least one side wall extending between the bottom wall and a device top end, the bottom wall and each side wall being substantially opaque; an upper wall member proximate the device top end, wherein the upper wall member is substantially transparent, wherein the upper wall member has an inner side facing the bottom wall and an outer side opposite to the inner side; and a camera arranged facing the inner side of the upper wall, wherein the camera is operable to capture images of objects positioned on the outer side of the upper wall.

The upper wall member can be recessed below the device top end.

The upper wall member can include a void section sized to permit a finger to pass therethrough, the void section can be arranged to facilitate removal of objects positioned on the upper wall member.

A portion of the at least one side wall can include a cut-out section aligned with the void section. The portion may include a movable side wall section that is movable to close the cut-section.

The enclosure may be substantially rectangular.

The upper wall member can be shaped to receive at least two adjacent playing cards.

The upper wall member can be shaped to receive at least five adjacent playing cards.

The device can be mounted to a movable base.

The device can be mounted to a movable arm extending from the movable base.

The device can include a processor; and a communication interface; where the processor can be configured to: obtain the images from the camera; and transmit the images to a remote user device via the communication interface.

The at least one sidewall can contain a slot shaped to receive a playing card, where the slot is located between the upper wall member and the device top end.

The device can be provided included by a game-specific interaction unit.

In an aspect of this disclosure, there is provided a device for handling casino chips, the device comprising: a chip receiving area sized to house a plurality of casino chips, the chip receiving area extending longitudinally from a first end to a second end, wherein the second end is open; at least one sidewall extending from the first end to the second end, the at least one sidewall defining a perimeter of the chip receiving area; and at least one movable member, wherein the at least one movable member is movable within the chip receiving area to selectively dispense the casino chips from the chip receiving area.

The chip receiving area can be a cylindrical channel.

The at least one movable member can include an ejection member that is movable longitudinally within the chip receiving area from the first end towards the second end.

The at least one movable member can include a movable sidewall member, where the movable sidewall member is movable outwardly away from the chip receiving area.

The device can include a plurality of inwardly extending projections, where each projection extends inwardly into the chip receiving area from a given sidewall member of the at least one sidewall member.

The projections can be spaced apart in the longitudinal direction from longitudinally adjacent projections by a distance about equal to the height of one casino chip.

The projections can be retractable.

The projections can be controllably retractable.

The plurality of projections can include a plurality of aligned groups of projections, where each projection within an aligned groups of projections is aligned in the longitudinal direction, and each group of projections reduces the perimeter of the chip receiving area to less than a width of the casino chips.

The at least one sidewall member can be arranged to define the perimeter of the chip receiving area to be greater than a width of the casino chips.

The chip receiving area can include a cylindrical channel.

In an aspect of this disclosure, there is provided a device for enabling participation in a casino game, the device comprising: a device body, the device body containing a controller and a memory; a display coupled to the controller, the display operable to display a wager value associated with the casino game; a user input interface coupled to the controller, the user input operable to receive user wager inputs; wherein the controller is configured to adjust the wager value in response to one or more wager inputs received by the user input interface.

The device body can be substantially cylindrical.

The device body can be shaped to correspond to a standard casino chip.

The user input interface can include at least two buttons, the at least two buttons including an increase wager button and a decrease wager button, where the controller is operable to adjust the wager value by a predefined amount in response to a wager input received at either one of the at least two buttons.

The device can include a wireless communication module, where the device is operable to communicate wirelessly with a remote server storing user account data.

The memory can store an available wager amount, and the controller can be operable to adjust the wager value to a maximum wager amount that is defined based on the available wager amount.

The device can include a biometric identification system, wherein the biometric identification system is operable to authenticate a particular user, and the controller is configured to prevent the wager value from being adjusted prior to authentication of the particular user.

It will be appreciated by a person skilled in the art that an apparatus, system or method disclosed herein may embody any one or more of the features contained herein and that the features may be used in any particular combination or sub-combination.

These and other aspects and features of various embodiments will be described in greater detail below.

DRAWINGS

The drawings included herewith are for illustrating various examples of articles, methods, and apparatuses of the present specification and are not intended to limit the scope of what is taught in any way. In the drawings.

Figure 1:
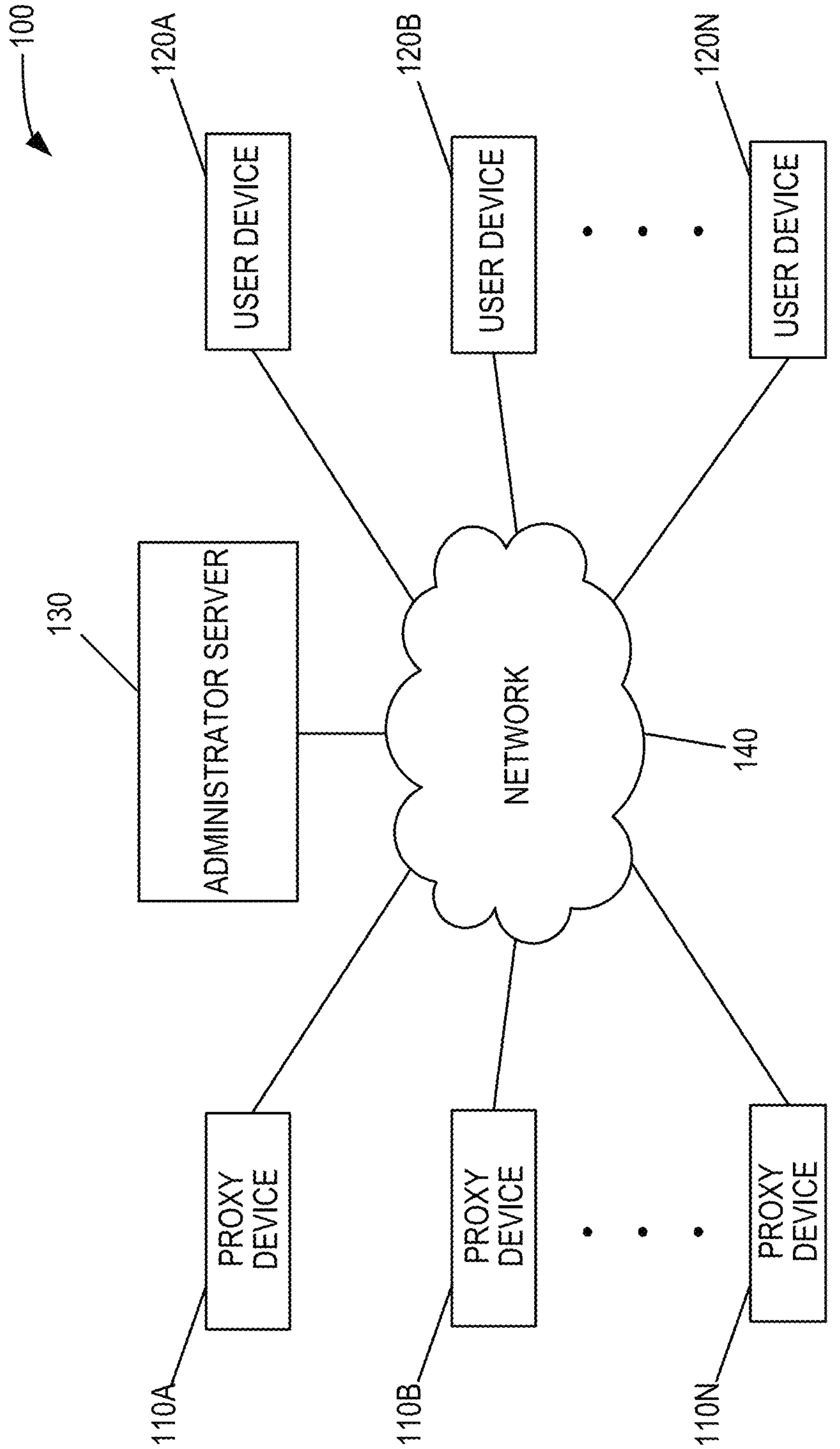
FIG. 1 is a block diagram of an example system for enabling remote participation in in-person games.

The drawings included herewith are for illustrating various examples of systems, methods, and apparatuses of the teaching of the present specification and are not intended to limit the scope of what is taught in any way.

DESCRIPTION OF VARIOUS EMBODIMENTS

Various apparatuses or processes or compositions will be described below to provide an example of an embodiment of the claimed subject matter. No embodiment described below limits any claim and any claim may cover processes or apparatuses or compositions that differ from those described below. The claims are not limited to apparatuses or processes or compositions having all of the features of any one apparatus or process or composition described below or to features common to multiple or all of the apparatuses or processes or compositions described below. It is possible that an apparatus or process or composition described below is not an embodiment of any exclusive right granted by issuance of this patent application. Any subject matter described below and for which an exclusive right is not granted by issuance of this patent application may be the subject matter of another protective instrument, for example, a continuing patent application, and the applicants, inventors or owners do not intend to abandon, disclaim or dedicate to the public any such subject matter by its disclosure in this document.

For simplicity and clarity of illustration, reference numerals may be repeated among the figures to indicate corresponding or analogous elements. In addition, numerous specific details are set forth in order to provide a thorough understanding of the subject matter described herein. However, it will be understood by those of ordinary skill in the art that the subject matter described herein may be practiced without these specific details. In other instances, well-known methods, procedures and components have not been described in detail so as not to obscure the subject matter described herein. The description is not to be considered as limiting the scope of the subject matter described herein.

The terms "coupled" or "coupling" as used herein can have several different meanings depending on the context in which these terms are used. For example, the terms coupled or coupling can have a mechanical, electrical or communicative connotation. For example, as used herein, the terms coupled or coupling can indicate that two elements or devices are directly connected to one another or connected to one another through one or more intermediate elements or devices via an electrical element, electrical signal, or a mechanical element depending on the particular context. Furthermore, the term "communicative coupling" may be used to indicate that an element or device can electrically, optically, or wirelessly send data to another element or device as well as receive data from another element or device.

As used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof. Furthermore, the phrase "at least one of A and B" is intended to mean only A, only B, or a combination of A and B.

Terms of degree such as "substantially", "about", and "approximately" as used herein mean a reasonable amount of deviation of the modified term such that the end result is not significantly changed. These terms of degree may also be construed as including a deviation of the modified term if this deviation would not negate the meaning of the term it modifies.

Any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The systems, methods, and devices described herein may be implemented as a combination of hardware or software. In some cases, the systems, methods, and devices described herein may be implemented, at least in part, by using one or more computer programs, executing on one or more programmable devices including at least one processing element and a data storage element (including volatile and non-volatile memory and/or storage elements). These devices may also have at least one input device (e.g. a pushbutton keyboard, mouse, a touchscreen, a foot-operated controller, and the like), and at least one output device (e.g. a display screen, a printer, a wireless radio, and the like) depending on the nature of the device.

Some elements that are used to implement at least part of the systems, methods, and devices described herein may be implemented via software that is written in a high-level procedural language such as object-oriented programming. Accordingly, the program code may be written in any suitable programming language such as Python or C, for example. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific, and predefined manner in order to perform at least one of the methods described herein.

Furthermore, at least some of the programs associated with the systems and methods described herein may be capable of being distributed in a computer program product including a computer readable medium that bears computer usable instructions for one or more processors. The medium may be provided in various forms, including non-transitory forms such as, but not limited to, one or more diskettes, compact disks, tapes, chips, and magnetic and electronic storage. Alternatively, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

REMOTE GAMING SYSTEM

Referring now to FIG. 1, there is provided is a block diagram of a remote gaming system 100. The system 100 is an example of a networked system that enables users to remotely participate in live, in-person games occurring at gaming venues/facilities such as casinos. System 100 enables remote users to participate in live games alongside users physically present at the gaming venue.

Enabling users to remotely participate in live games can help increase user engagement by providing many of the same experiences as gaming in-person at the gaming venue. Remote users can also minimize or avoid some of the less desirable aspects of in-person gaming such as smoking, noise, transmittable diseases, unpleasant interactions with other users, theft, harassment etc. Remote users can further take advantage of increased privacy and security by participating in games from the safety and comfort of their home or other desired participation location.

Remote gaming system 100 (also referred to as a proxy gaming system) generally includes a plurality of computers connected via data communication network 140, which itself may be connected to the Internet. In general, however, the computer network system includes one or more proxy devices 110A-110N (collectively referred to as proxy devices 110 and which may also be referred to as robotic proxies or robotic proxy devices), one or more user devices 120A-120N (collectively referred to as user devices 120 and which may also be referred to as player devices), and an administrator computer 130 connected via network 140. In the example system 100 illustrated, the proxy device(s) 110 and administrator computer 130 may be collectively referred to as an on-location gaming system.

Typically, the connection between proxy device(s) 110 and administrator computer 130 and the Internet may be made via a firewall server (not shown). In some cases, there may be multiple links or firewalls, or both, between proxy device(s) 110 and administrator computer 130 and the Internet. Some organizations may operate multiple networks 140 or virtual networks 140, which can be internetworked or isolated. These have been omitted for ease of illustration, however it will be understood that the teachings herein can be applied to such systems. Network 140 may be constructed from one or more computer network technologies, such as IEEE 802.3 (Ethernet), IEEE 802.11 and similar technologies.

Computers and computing devices may be connected to network 140 or a portion thereof via suitable network interfaces. Computing devices may also encompass any connected or “smart” devices capable of data communication, such as refrigerators, thermostats, industrial equipment and the like. Increasingly, this encompasses a wide variety of devices as more devices become networked through the “Internet of Things”. In some cases, one or more of the computing devices such as the user devices 120 may connect to network 140 via the Internet.

A proxy device 110 generally refers to a device or unit that can be located or positioned at a gaming facility where a live game is ongoing. The proxy device 110 enables a user to participate in the live game even while the user is not present at the gaming facility. The proxy device 110 can include various processing components, memory components, network components and input/output components to enable the remote user to control operation of the proxy device 110 to participate in the game. The proxy device 110 can thus act or operate as a participant in the live casino game as a proxy for (e.g. in the place of) the remote user. An example proxy device 110 is described in further detail herein below with reference to FIG. 2.

The proxy gaming system 100 enables a user to participate in a live game even while the user (and the associated user device 120) are at a different physical location from the location where the live game is ongoing. A user can interact with their corresponding user device 120 to control the operations of a proxy device 110 to participate in the live game alongside in-person participants. The proxy device 110 can perform actions on behalf of the remote user in response to control instructions received from a corresponding user device 120. The user can input instructions to their user device 120 to cause or direct the proxy device 110 to perform various actions related to the live game, such as placing wagers, collecting winnings, and performing various game specific actions (e.g. a hit action in blackjack, a fold action in poker, etc.). The user device 120 can transmit instructions to the proxy device 110 over network 140. The actions that a proxy device 110 may perform can vary depending on the implementation and/or the particular game in which the user is participating.

The proxy device 110 can also communicate with the user device 120 to provide feedback data relating to the ongoing game, the game environment, and/or the game venue. The proxy device 110 can include one or more input devices usable to capture feedback data relating to the game (e.g. game status, wager data, card data etc.) and/or the gaming environment (e.g. number of other players participating, audio and/or visual inputs from other players, input from a dealer, etc.) and/or the venue (e.g. other games available, audio and/or visual inputs from the venue or other players present in the venue, etc.). The proxy device 110 can transmit the feedback data to the user device 120 over network 140.

The proxy device 110 can also implement various physical and electronic security measures. For instance, the proxy device 110 can be configured to establish a secure communication channel with the remote user device 120. This can help prevent unwanted intrusions by third parties. This can also ensure that the remote user can be authenticated as a user who is permitted to participate in the game (e.g. a person who satisfies age or other requirements for participation).

Optionally, the proxy device 110 can include a physical network connector (e.g. a network cable such as an Ethernet cable). The physical network connector can be used to establish a corresponding wired connection at each gaming location to establish a physical connection between the proxy device 110 and the casino IT infrastructure. This may help prevent interference with the communications between the proxy device 110 and the remote user device 120.

The user devices 120 can be provided by one or more computers such as desktop, laptop, smartphone or tablet computer, however user devices 120 may also include a wide variety of “smart” devices capable of data communication. Each user device 120 has a processor, volatile and non-volatile memory, at least one network interface, input devices such as a keyboard and trackpad, output devices such as a display and speakers, and various other input/output devices as will be appreciated. User device 120 may be portable, and may at times be connected to network 140 or a portion thereof. User device 120 can connect to network 140 via a wired or wireless network connection. The user device 120 may also connect to the network 140 via the Internet.

Administrator server 130 is a computer server that is connected to network 140. Like computer 120, server 130 has a processor, volatile and non-volatile memory, at least one network interface, and may have various other input/output devices. As with all devices shown in computer network system 100, there may be multiple servers 130, although not all are shown. The proxy devices 110, user devices 120 and administrator server 130 are described in greater detail with reference to FIG. 2 below.

Each of the computers and computing devices may at times connect to external computers or servers via the Internet. For example, proxy device 110 or user device 120 may connect to a software update server to obtain the latest version of a software application or firmware.

Server 130 may be configured to provide a remote gaming platform (also referred to as a proxy gaming platform). The remote gaming platform may be remotely accessible to user devices 120 over network 140. For example, the server 130 may provide a remote gaming platform that is accessible over the Internet by accessing a website associated with the gaming platform. A user may operate a browsing application on the user device 120 and navigate to the corresponding website to access the gaming platform.

The gaming platform may enable users to remotely participate in games that are ongoing in person at various locations, including casino locations. The gaming platform may enable users to remotely control proxy devices 110 to participate in live, in-person games even while not physically present at the location where the in-person game is ongoing. A user can control operations of the proxy devices 110 to participate in the in-person games, by interacting with the gaming platform through user device 120.

Alternatively or in addition, the server 110 may provide a proxy gaming platform that is accessible through a proxy gaming application deployed on, or otherwise operable by, the user device 120. A player may then operate the proxy gaming application on the user device 120 to interact with the proxy gaming platform.

As used herein, the term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled.

The software application may be associated with an application identifier that uniquely identifies that software application. In some cases, the application identifier may also identify the version and build of the software application. A software application may be recognized by a name by both the people who use it, and those that supply or maintain it. Mobile applications or "apps" generally refers to software applications for installation and use on mobile devices such as smartphones and tablets or other "smart" devices.

The proxy gaming system 100 can be configured to allow different users to interface with the proxy devices 110. A user can establish a connection with a particular proxy device 110 through the system 100 in order to participate in an in-person game. For example, a user can log into a proxy gaming platform interface through their user device 120.

Each user can have user account data associated with the proxy gaming platform. The user account data can include various types of data corresponding to the user, such as the user's identity (e.g. legal name, identity documents such as a drivers' license or passport), user demographic data (e.g. age, location), user financial data (e.g. a deposit account, associated bank accounts and/or credit cards) and so forth.

Each user can also have associated user authentication data that allows the user to access the corresponding account established on the proxy gaming platform. Examples of authentication data can include a user identifier (e.g. a username) and a user password. The authentication data may also include biometric data associated with the user. The user biometric data can be used to verify the user's identity when accessing the user account.

The proxy gaming system 100 can also implement various user authentication methods to ensure that a remote user is permitted to participate in a live game. For example, the proxy gaming platform can include live user authentication processes to authenticate a user in real time.

The live user authentication process can include a user authenticating themselves in real-time using a video link. The live user authentication processes can require a user to authenticate themselves using identity documents and/or biometric data associated with the user account. The live user authentication processes may also require the user to establish their location in real-time (e.g. through location data provided by or from the user device 120) to ensure that they are permitted to participate in the game (e.g. in accordance with laws or regulations pertaining to the user's location and/or the game location).

Optionally, the proxy gaming system 100 can continually authenticate the user while a game is ongoing. The proxy gaming system 100 may be configured to require continual user authentication to enable the user device 120 to continue to control the proxy device 100 to participate in a game. For example, the proxy gaming system 100 may require a user to be authenticated at specified intervals or during each stage of a given game. This may ensure that the user actually participating in the game satisfies the gaming requirements while the game is ongoing.

Each proxy device 110 can participate in games occurring at a particular venue. For example, the proxy devices 110 can participate in live games occurring at casino venues. To facilitate the participation of proxy devices, the casino venues can be configured to monitor the proxy devices in a manner similar to the monitoring of live players. The actions and wins/losses of the proxy devices 110 can be monitored by personnel at the casino venue and/or electronic monitoring systems such as video cameras positioned within the venue. This can ensure that remote players and live players have confidence in the security and quality of the ongoing game.

Casino monitoring devices can monitor and record the wagers and actions performed by the proxy device 110 as with in-person players at the casino. This can allow for playback if wagering disputes are challenged or when confirmation of payouts are required. This can also help remote players maintain confidence that in-person players are not tampering with the proxy device's 110 participation in the live games.

Figure 2:
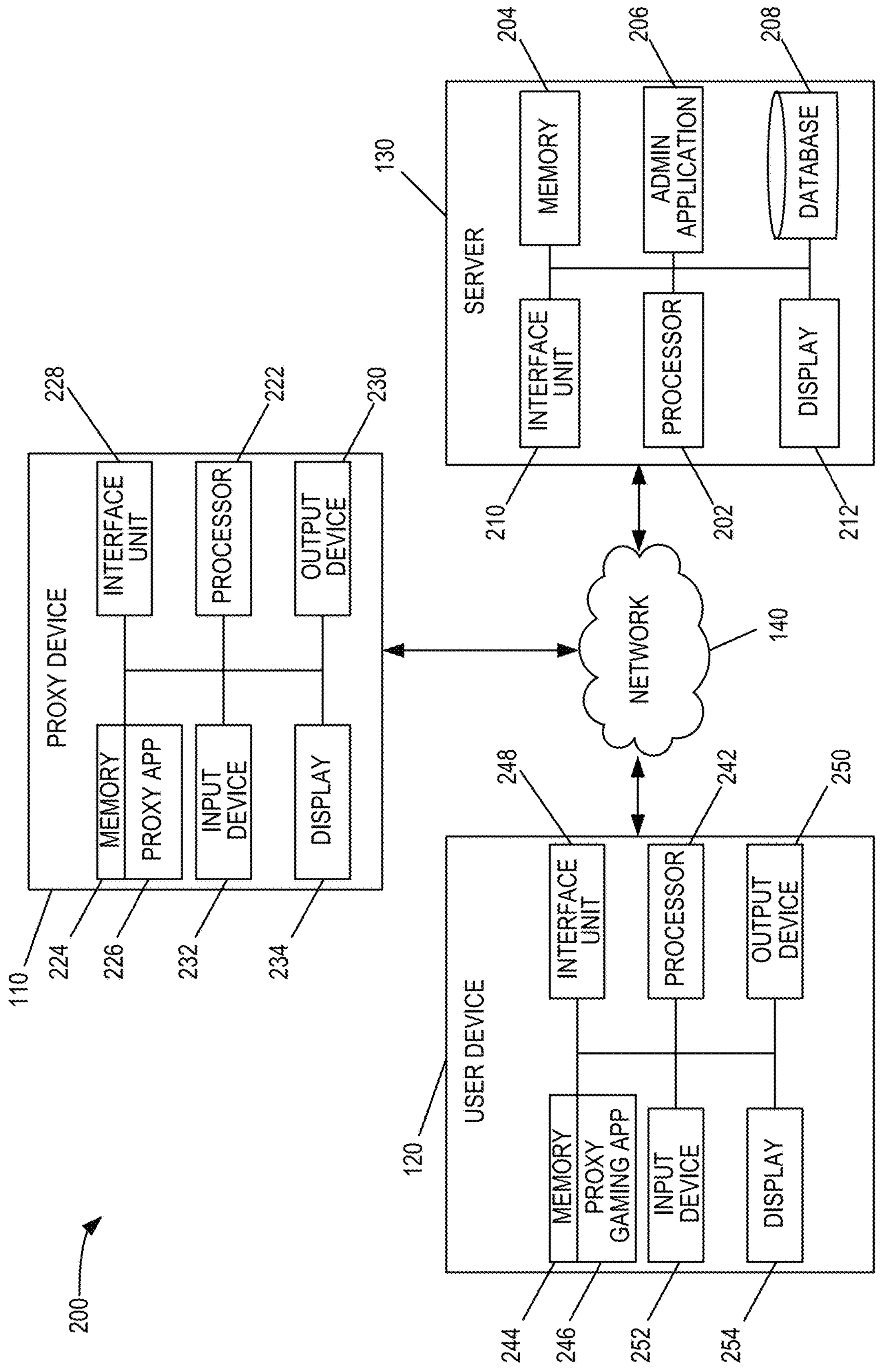
FIG. 2 is a block diagram of an example proxy device, user device and server that can be used with the system shown in FIG. 1.

Referring now to FIG. 2, shown therein is a block diagram of a proxy gaming system 200 in accordance with an example embodiment. In the example illustrated, proxy gaming system 200 includes a proxy device 110, a user device 120 and a server 130.

Server 130 may be directly linked to proxy device 110, for example, via a Universal Serial Bus, Bluetooth™ or Ethernet connection. Alternatively, server 130 may be linked to the proxy device 110 via network 140 or, in some cases, the Internet. Server 130 may also be linked to user devices 120 via network 140 or, in some cases, the Internet.

Server 130 has a processor 202, a memory 204, a communication interface 210, a display 212 and a database 208. Although shown as separate elements, it will be understood that database 208 may be stored in memory 204.

Processor 202 is a computer processor, such as a general-purpose microprocessor. In some other cases, processor 202 may be a field programmable gate array, application specific integrated circuit, microcontroller, or other suitable computer processor.

Processor 202 is also coupled to display 212, which is a suitable display for outputting information and data as needed by various computer programs. In particular, display 212 may display a graphical user interface (GUI). In some cases, the display 212 may be omitted from server 130, for instance where the server 130 is configured to operate autonomously to support a proxy gaming platform. In such cases, the server 130 may be configurable using a computer such as an administrator computing device (now shown) that is connected to the server 130. Server 130 may execute an operating system, such as Windows Server, MAC OS X Server, a GNU/Linux server operating system, or other suitable operating system.

The interface unit 210 may be any interface that allows the server 130 to communicate with other devices or computers. For example, communication interface 210 may include one or more data network interface, such as an IEEE 802.3 or IEEE 802.11 interface, for communication over a network. Interface unit 210 may include at least one of a serial port, a parallel port or a USB port that provides USB connectivity. Optionally, communication interface 210 may include a wireless unit such as a radio that communicates utilizing CDMA, GSM, GPRS or Bluetooth protocol according to standards such as IEEE 802.11a, 802.11b, 802.11g, or 802.11n. The wireless unit can be used to communicate with other devices or computers, such as administrator device 120 and/or user device 130.

Processor 202 is coupled, via a computer data bus, to memory 204. Memory 204 may include both volatile and non-volatile memory. Non-volatile memory stores computer programs consisting of computer-executable instructions, which may be loaded into volatile memory for execution by processor 202 as needed. It will be understood by those of skill in the art that references herein to admin server 130 as carrying out a function or acting in a particular way imply that processor 202 is executing instructions (e.g., a software program) stored in memory 204 and possibly transmitting or receiving inputs and outputs via one or more interface. Memory 204 may also store data input to, or output from, processor 202 in the course of executing the computer-executable instructions.

The memory 204 on server 130 may store a software application referred to herein as an admin application 206. Although shown as separate elements, it will be understood that admin application 206 may be stored in memory 204.

The admin application 206 may be configured to support a proxy gaming platform accessible by a player device such as user device 120. The proxy gaming platform may include an interactive platform interface in which a user is able to remotely interface with, and control, a proxy device 110 at a gaming location. A user may interact with the platform interface using the user device 120 in order to view available proxy devices 110, select a particular proxy device for play, and participate in proxy gaming through the selected proxy device. An example process of participating in a live game that may be implemented using the admin application 206 is described in further detail herein below with reference to FIG. 3.

The platform interface may also provide additional account-based functionality for a user. For example, the platform interface may allow the user to establish a personalized account, add and remove monetary value in order to participate in casino games and retrieve winnings, and to interact with other players (including live players and other proxy players). Optionally, user account data may be stored by the admin server 130 using database 208.

The admin application 206 can also include user authorization and user authentication features to ensure that a user is authorized and authenticated prior to participating in a proxy gaming activity. The admin application 206 can also include various security functions to prevent unauthorized access to the proxy devices 110 and/or to user account details. For example, various encryption techniques may be used to ensure that user account details stored in the database 208 are stored in a cryptographically secure manner.

The admin application 206 is presented primarily for ease of exposition, and it should be understood that the features and operations described in association with the server 130 and/or admin application 206 may be performed using a plurality of software applications. Similarly, the features and operations described in association with the admin server 130 may be distributed across multiple admin servers and/or other admin processors.

As noted above, memory 204 may also store database 208. In some example embodiments, database 208 is a relational database. In other embodiments, database 208 may be a non-relational database, such as a key-value database, NoSQL database, or the like.

The database 208 can store a user database. The user database can include a plurality of user records. Each user record can be associated with a particular user of the proxy gaming platform. The user records can include user account data associated with the user. The user records can also include various user activity data associated with the user's activity on the proxy gaming platform. For example, the user activity data can include historical data relating to the user's participation in games through the proxy gaming platform, the user's historical performance, etc.

The database 208 can also include venue data. The venue data can include a plurality of venue records. Each venue record can be associated with a particular venue that is remotely accessibly through the proxy gaming platform. The venue data within a given venue record can include various types of data associated with a particular venue, such as the name, location, available game types, no. of available seats, venue-specific rules or regulations, and so forth.

The database 208 can also include proxy device data. The proxy device data can include data relating to the plurality of proxy devices accessible through the proxy gaming platform. The proxy device data can include, for a given proxy device, associated venue data (e.g. the venue or venues where that proxy device can be used), current availability status (e.g. whether the proxy device is currently in-use or can be accessed by a new user), compatible game types (e.g. the types of games the proxy device can be used to participate in), and so forth.

The database 208 can also include game data. The game data can include data relating to a plurality of live in-person games that have occurred, are ongoing, or will occur in the future. The game data can include, for a given game, the type of game, whether a seat is available for a user to participate in the game, the game timing, game results, and so forth.

Optionally, server 200 (or a component thereof) may be specific to a particular gaming venue. This may provide the game venue operator with increased control over the participation of remote users in games that are ongoing at the game venue.

In such cases, the server 200 may be coupled solely to proxy devices 110 located at that game venue. Optionally, the server 200 (or a component thereof) may communicate with the proxy devices 110 using a secure internal network at the game venue. This may provide enhanced security over the actions performed by the proxy devices 110 at that venue.

Alternatively or in addition, the server 200 may be located external to a given game venue. Optionally, the server 200 can be configured to communicate with multiple game venues and with proxy devices 110 located or locatable at multiple game venues. This can provide remote users with increased choice of the game venues, games, and proxy devices they participate with.

Optionally, the server 200 can include components both external to and internal to one or more game venues. This can provide remote users with increased choice and variability while also allowing game venue operators to have greater control over remote user participation at their venues.

Figure 9:
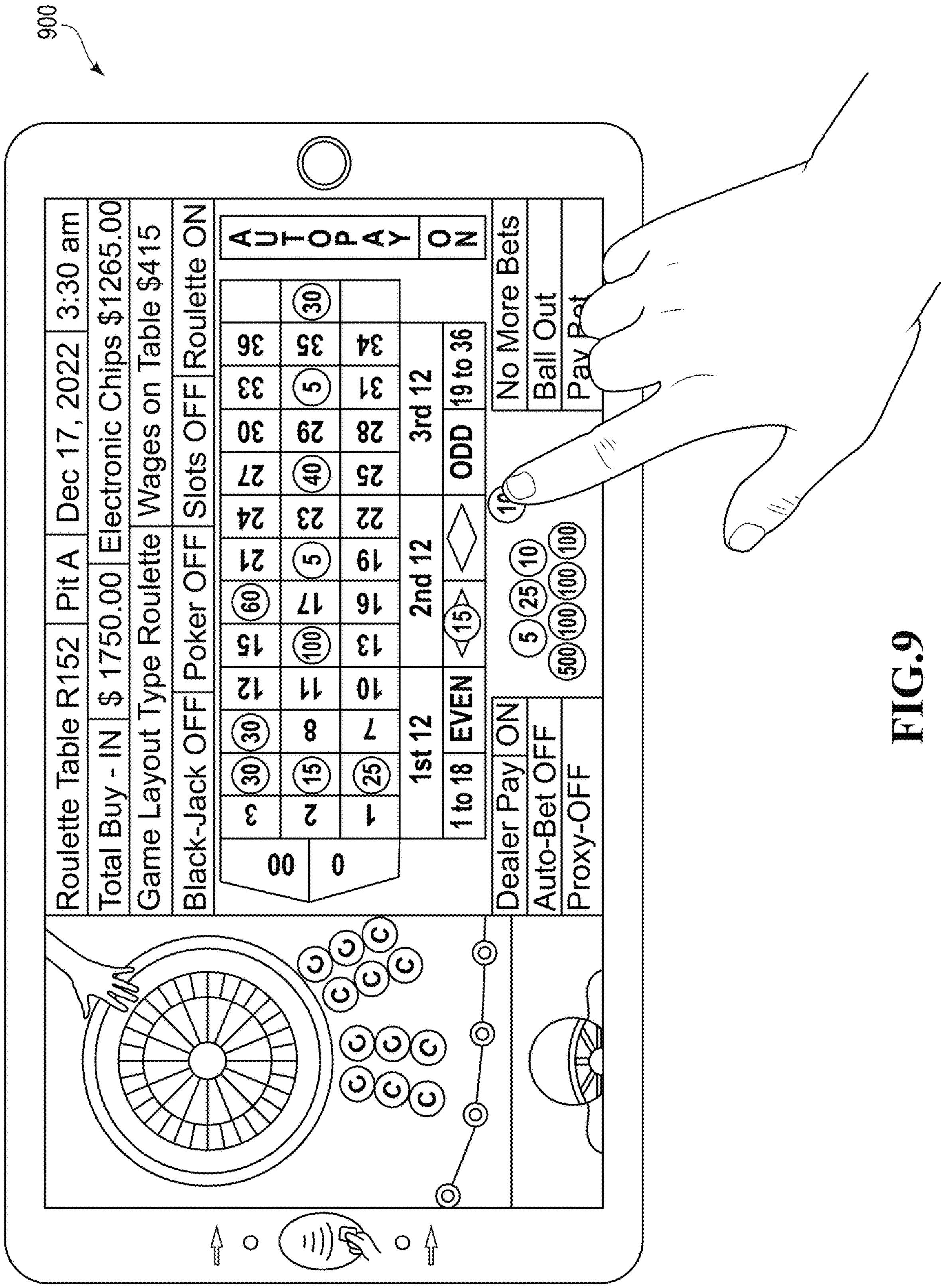
FIG. 9 is a top view of an example user device that can be used to participate in live in-person games.

User device 120 is generally a computing device usable by a player. For example, user device 120 may be a desktop computer, laptop computer or a mobile computer such as a smartphone or tablet or other "smart" device that may be networked through the "Internet of Things". An example user device 120 is shown in FIG. 9 in the form of tablet 900.

User device 120 has a processor 242, a communication interface 248 for data communication with communication interfaces 210 and 228, a display 254 for displaying a proxy gaming platform GUI, and a memory 244 that may include both volatile and non-volatile elements. Display device 254 may include any type of device for presenting visual information. For instance, the display 254 may be a cathode ray tube, a flat-screen monitor and the like if the user device 120 is a desktop computer. In other cases, the display 254 may be a display suitable for a laptop, tablet or handheld device such as an LCD-based display and the like.

The user device 120 also includes at least one input device 252 (e.g. a pushbutton keyboard, mouse, camera, touchscreen, biometric reader, microphone, and the like), and may include at least one output device 250 (e.g. a printer, a wireless radio, a speaker and the like). As with server 130, references to acts or functions by user device 120 imply that processor 242 is executing computer-executable instructions (e.g., a software program) stored in memory 244.

For instance, a proxy gaming application 246 may be stored on the user device 120. Although shown separately from memory 244, it will be understood that proxy gaming application 246 may be stored in memory 244. The proxy gaming application 246 may communicate with the proxy gaming platform provided by the admin application 206 of admin server 130 to allow a user to remotely control a proxy device 110 and participate in a gaming activity.

Optionally, proxy gaming application 246 may be a dedicated application, such as a downloadable mobile application provided by the admin server 130. A user of the user device 120 may download the proxy gaming application 246 from admin server 130 or through an app store such as the Apple App Store or Google Play. Alternatively, the proxy gaming application 246 may be a web browser application on the user device 120, which can be used to navigate to a website hosting the proxy gaming platform interface.

The user may interact with the proxy gaming platform GUI presented through the browser application or dedicated application. An example process of participating in a gaming activity through a proxy device using the proxy gaming application 246 is described in further detail herein below with reference to FIG. 3.

Proxy device 110 includes a computer similar to user device 120 and server 130. The proxy device 110 has a processor 222, a communication interface 228 for data communication with communication interfaces 210 and 248, a display 234, and a memory 224 that may include both volatile and non-volatile elements.

The proxy device 110 also includes at least one input device 232 (e.g. a pushbutton keyboard, mouse, camera, microphone, touchscreen, biometric reader and the like), and may include at least one output device 230 (e.g. a printer, a wireless radio, a speaker and the like). As with admin server 130 and user device 120, references to acts or functions by proxy device 110 imply that processor 222 is executing computer-executable instructions (e.g., a software program) stored in memory 224.

A proxy application 226 may be stored on the proxy device 110. Although shown separately from memory 224, it will be understood that proxy application 226 may be stored in memory 224. The proxy application 226 may communicate with the admin application 206 of admin server 130 to provide the admin application with updated proxy device data, configure the proxy device 110, establish communication links with user devices 120, and provide feedback data relating to the operation of the proxy device 110.

Optionally, the proxy application 226 can be configured to communicate with the admin server 130 over a local private network (e.g. where the admin server 130 is located at a venue location). This may provide enhanced security for communications between the proxy device 110 and admin server 130. Optionally, the proxy device 110 and admin server 130 may communicate using a hardwired connection (e.g. an ethernet connection) to further mitigate the possibility of communications being intercepted by a third-party.

The proxy application 226 can also communicate with the proxy gaming application 246 of the user device 120 to configure the proxy device to participate in an in-person game and to provide feedback to the user device 120. An example process of using the proxy device to participate in an in-person game that may be implemented using the proxy application 226 is described in further detail herein below with reference to FIG. 3.

In general, the proxy device 110 can be configured to participate (as a proxy for the user of user device 120) in an in-person gaming activity, e.g. a casino game such as blackjack, poker (see e.g. FIGS. 6A-6A), roulette (see e.g. FIGS. 4A-4C), slots (see e.g. FIG. 7) and the like. The proxy device 110 can be provided in various forms, including mobile and fixed proxy devices, as well as adaptable proxy devices. The physical structure of the proxy device 110, including optional modifications and adaptations, are described in further detail herein below.

The proxy device 110, user device 120 and administrator server 130 may have various additional components not shown in FIG. 2. For example, additional input or output devices (e.g., keyboard, pointing device, etc.) may be included beyond those shown in FIG. 2.

In the description that follows devices such as proxy device 110, user device 120 and/or server 130 are described performing certain acts. It will be appreciated that any one or more of these devices may perform an act automatically or in response to an interaction by a user of that device. For example, the user of the device 120 may manipulate one or more input devices 252 (e.g. a touchscreen, a mouse, or a button) causing the device 120 to perform the described act. In many cases, this aspect may not be described below, but it will be understood.

Figure 3:
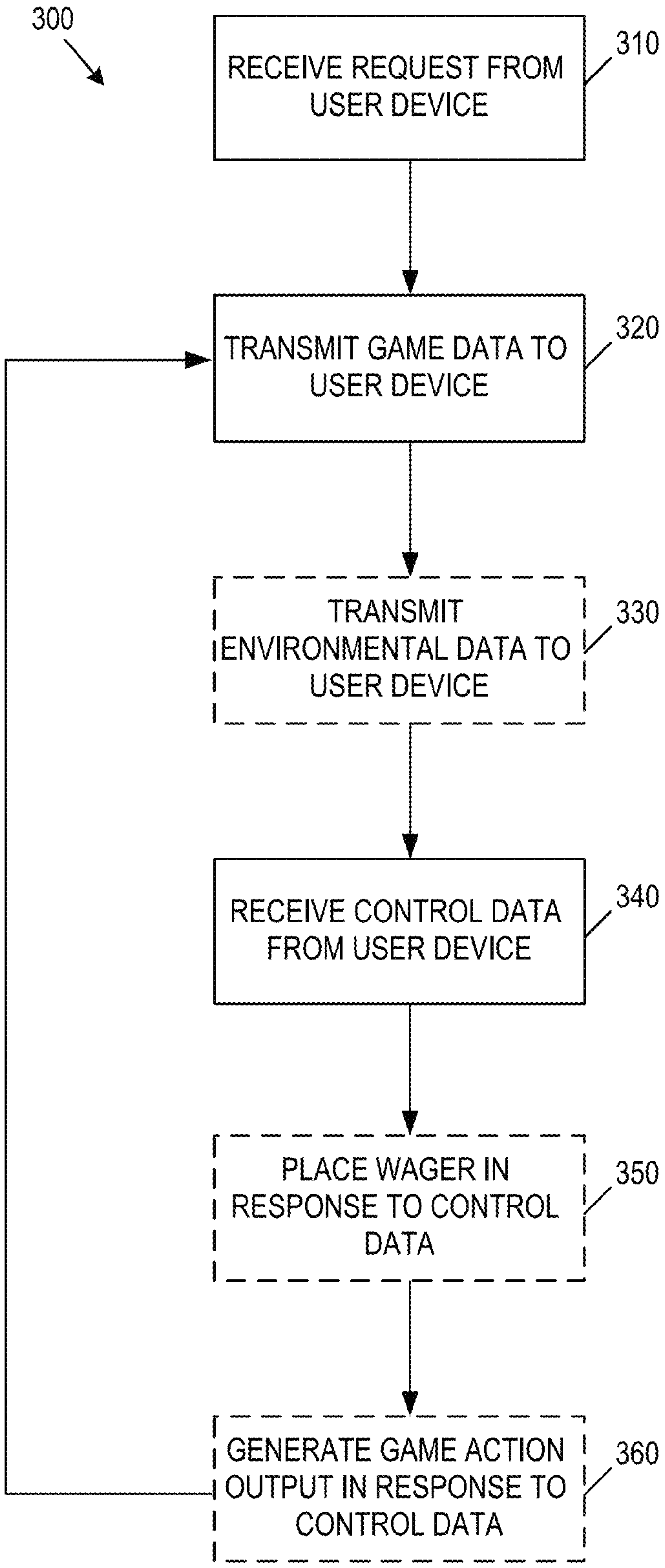
FIG. 3 is a flowchart of an example method for enabling remote participation in in-person games.

Referring now to FIG. 3, shown therein is a flowchart of an example process 300 for providing proxy gaming for in-person gaming activities. Process 300 is an example proxy gaming process that can be implemented by system 100 and/or system 200.

In general, process 300 may be implemented using at least one proxy device 110 accessible to a user device 120, e.g. through a proxy gaming platform. One or more servers (e.g. server(s) 130) can be configured to provide the proxy gaming platform. The one or more servers can be communicatively coupled to both the proxy device 110 and the remote user device 120. The proxy device 110 can be located at the venue location (e.g. a casino) where the in-person gaming activity is on-going.

Optionally, the proxy device 110 can be a venue-specific proxy device associated with a particular venue. A venue-specific proxy device may be capable of enabling a user to participate in in-person games at a single specific venue.

Alternatively, the proxy device 110 can be a transportable proxy device capable of being transported between different venues. Such a proxy device may be capable of enabling users to participate in in-person games at multiple venue locations.

At 310, a request can be received from a user device. A user operating the user device can transmit a request to participate in an in-person game at a venue location (e.g. a casino). The request can be transmitted to a proxy device 110, e.g. via a proxy gaming platform. The request can include a user request to use a proxy device to participate in the in-person game.

A user can initiate a request in various ways. For example, a user can input a request to the proxy gaming platform through the proxy gaming application 246 on their device 120. The request can include request data usable by the proxy gaming platform to establish a gaming session between the user device 120 and a particular proxy device 110.

Optionally, the request data may specify a particular proxy device 110 that the user is requesting to use for a gaming session. For example, a user may have a preferred proxy device (e.g. a "lucky" proxy device) that they wish to use. The user can then include a requested proxy identifier in the request data sent to the platform. Optionally, a user may define a nickname for their preferred proxy device within the proxy gaming platform to allow the user to easily requested the preferred proxy device.

Alternatively, a user may allow the proxy gaming platform to select a proxy device from amongst the available proxy devices connected thereto. The proxy gaming platform may select the proxy device in various ways, e.g. randomly or based on metrics such as device popularity, device location, device proximity to the user device, available game types at the device location, etc.

Optionally, the request data may specify a particular venue at which the user would like to participate in a game through a proxy device 110. The user can then include a requested venue identifier in the request data sent to the platform.

Alternatively, a user may allow the proxy gaming platform to select a venue from amongst the available venues connected thereto. The proxy gaming platform may select the venue in various ways, e.g. randomly or based on metrics such as availability, popularity, proximity, available game types, etc.

Optionally, the request data may further specify a particular location within the venue (e.g. a preferred table or preferred slot) where the user would like to participate in a gaming activity.

Alternatively, a user may allow the proxy gaming platform to select a location from amongst the available locations connected thereto. The proxy gaming platform may select the location in various ways, e.g. randomly or based on metrics such as availability, popularity, proximity, game type, etc.

Optionally, the request data may specify a particular game type that the user would like to participate in through a proxy device 110. The user can then include a requested game type in the request data sent to the platform.

Alternatively, a user may allow the proxy gaming platform to select a game type from amongst the available locations connected thereto. The proxy gaming platform may select the game type in various ways, e.g. randomly or based on metrics such as availability, popularity, proximity, user play history, etc.

The proxy gaming platform can establish a match between the user device 120 and a corresponding proxy device 110 based on the request data and data associated with the proxy devices, venues, and games accessible through the platform. For example, the proxy gaming platform can use the venue data, proxy device data, and game data stored in databased 208 to establish a match between the requesting user device 120 and a corresponding proxy device 110.

Once a match has been established between the requesting user device 120 and a corresponding proxy device 110, a gaming session can be established. The gaming session can allow the user to participate in one or more live in-person games remotely through the corresponding proxy device 110.

In some cases, the proxy gaming platform may not be able to establish an exact match for the request data. For example, where a user requests a particular proxy device, a particular venue or a particular game location within venue, the proxy gaming platform may not be able to establish an exact match if the requested device/venue/game location is not available. In such cases, the proxy gaming platform may provide the user with alternative proxy gaming options that are available.

Optionally, the request data may include a request to reserve a proxy device 110 for a specific date and/or time. This may allow a user to ensure that their desired device/venue/game location will be available when they plan to participate in a live in-person game.

Optionally, a user can specify a combination of a game type and/or desired device and/or venue and/or game location and/or seat. If the user-specified combination is not currently available, the proxy gaming platform can monitor availability and transmit a user prompt to the user device indicating that the user's desired combination is currently available.

The request data can be input by a user to the user device 120. Optionally, the proxy gaming platform can generate a session initiation user interface that is usable to initiate a gaming session. The session initiation user interface can provide a user with available gaming sessions that include the current availability status of particular proxy devices and/or venues and/or game types and/or game locations within venues. A user may then generate request data by selecting from the available gaming sessions.

The session initiation user interface can display all available gaming sessions to the user, including sessions at all venues coupled to the proxy gaming platform. Alternatively, the session initiation user interface can display available gaming sessions to the user within a subset of venues (e.g. one or more selected venues).

In response to the request, a gaming session can be established between the user device 120 and the proxy device 110. Once the gaming session has been established, a user can provide control inputs to the proxy device 110 via their user device 120. The user device 120 can also receive feedback data from the proxy device 110 while the gaming session is ongoing.

The gaming session can establish a communication link between the user device 120 and proxy device 110 in various ways. Optionally, a direct communication link between the user device 120 and proxy device 110 can be established for use during the gaming session. This can allow data to be transmitted directly between the user device 120 and proxy device 110. Alternatively or in addition, data can be transmitted between the user device 120 and proxy device 110 via the one or more servers operating the proxy gaming platform.

Optionally, the proxy gaming platform can perform one or more user authentication and/or user authorization procedures prior to establishing the gaming session. For example, a user may be required to log-in to an account with the proxy gaming platform prior to being able to establish a gaming session (e.g. even prior to transmitting a request). The user can provide user authentication data (e.g. a username and password; biometric data) to access their account.

Optionally, the proxy gaming platform may perform live user authentication to ensure that the user submitting the request is actually the user associated with a given account. For example, the proxy gaming platform may establish a live video connection with the user device 120 to authenticate the user in real-time. The live video connection may allow venue personnel (e.g. a pit boss, floor supervisor etc.) to actively verify the user in a manner similar to verifying that a live player is permitted to play. Alternatively or in addition, the user may be verified using automated user verification methods.

Optionally, the proxy gaming platform may perform various user authorization procedures to ensure that the user is permitted to participate in a requested game and/or at a requested venue. For example, the user's demographic data may be evaluated to ensure that the user is old enough to participate in casino games at the venue location. The user account data may also be evaluated to ensure that no self-exclusion data (or venue exclusion data) has been submitted to prevent the user from participating in the requested activity.

The user's current location can also be evaluated to determine whether the user is permitted to participate in the requested activity from their current location. For example, user location data from the user device 120 (e.g. global navigation satellite system (GNSS) data, a device IP address, Google location services data, Apple location services data etc.).

Once a gaming session has been established, the user can control the proxy device linked to their user device to participate in a live game at a particular venue. In some cases, the user can control the movement of the proxy device to a given venue and/or game location to initiate participation in a particular game.

Alternatively, the proxy device may be associated with a given venue and/or game location. In such cases, the user can initiate participation in a live game effectively immediately upon establishing a gaming session.

Once the proxy device has begun participating in the live game, method 300 can transition to steps 320-360. Steps 320-360 may be repeated (e.g. multiple times, on an ongoing basis) as the proxy device continues to participate in the live game and when the proxy device participates in other games for the same or other users.

Optionally, the proxy gaming platform may perform and/or repeat user authentication steps while the gaming session is ongoing. For example, the proxy gaming platform may continually authenticate the user (e.g. at regular intervals, at breaks in play, etc.) to enable the user to continue participating in the game. The proxy gaming platform may terminate or suspend a gaming session if the user is unable to be authenticated while the gaming session is ongoing. This may ensure that participation in the game is limited to the user authenticated at the outset of the game (e.g. to prevent unauthorized users from participating in games by having other authorized users perform the initial authentication).

At 320, the proxy device can transmit game data to the user device. The game data can include various types of data (e.g. audio, visual, signal data, and processed forms thereof) that represent or reflect the state of the game as it is occurring. The game data can be used by the remote user device to generate a status output representative of the state of the game.

In general, the proxy device can be configured to acquire game data relating to a status of the game. The proxy device can then transmit the game data to the user device (directly and/or via the one or more servers operating the proxy gaming platform).

For example, the game data can be used by the user device to present a user interface that includes an indication of the current status of the game that the linked proxy device is participating in. The game data can also be used by the user device to provide the user with available control inputs that can be selected for the proxy device given the current status of the game.

An example user interface is shown on tablet 900 in FIG. 9. As shown in the example of tablet 900, the user interface can display to the user the current game status and a virtual layout of the game table. The user interface can also provide real-time video and/or audio data, such as the live video feed of the roulette wheel shown in the left-hand side of tablet 900.

Optionally, a user may establish a gaming session through tablet 900. In establishing a gaming session, the user may input user identifier data usable to identify the user. The user identifier data can be used to ensure that the wagers placed using the tablet 900, and any associated payouts, can be associated with that user. For example, the user identifier data may be included as part of user authentication data associated with a user account established on the proxy gaming platform.

As illustrated, the user interface can also provide control inputs allowing the user to select wagers to be placed for the game ongoing at the roulette table. The user interface can also provide game and game-related data (e.g. no more bets, ball out etc.), proxy status data (e.g. proxy on/off, auto-bet on/off), and game and game-related data such as the user's current buy-in amount and the game table location. As should be apparent, the user interface shown in FIG. 9 is merely an example and different user interface configurations and/or data can be used in accordance with the disclosure herein. The user device may also allow a user to input value, e.g. through an established user account and/or by directly depositing value through a debit or credit transaction.

The proxy device can be configured to acquire game data using one or more data acquisition input devices. For example, the proxy device can acquire game data using a video input device (e.g. a camera) and/or audio input device (e.g. a microphone). In some cases, the proxy device and/or proxy gaming platform and/or user device can analyze the acquired audio data and/or video data and/or signal data to detect the game data. The game data may then be disaggregated from other data acquired by the proxy device, such as environmental data for example.

Optionally, the proxy device can also be configured to acquire other game related data, e.g. signal data from a game-associated device such as a slot machine and/or a signaling device associated with a given game and/or used by a dealer.

In some cases, the game data can include user-specific data not available (e.g. not visible) to any other players participating in the game. For example, where the user is remotely participating in a poker game the game data can include user-specific data in the form of user card data indicating the cards in the user's hand.

The game data can also include participant wager data relating to the game. The participant wager data can include live player wager data for one or more live players participating live in the game at the venue location. The participant wager data can include remote player wager data for one or more remote players participating live in the game remotely via a proxy device.

The game data can also include dealer data (also referred to as croupier data) representing data associated with the dealer or croupier for a given table game. The dealer data can include instruction data relating to an instruction issued or provided by the dealer of the casino game.

Optionally, the proxy device can be configured to identify a specified action performed by the dealer of the game. The proxy device, proxy gaming platform, and/or user device can be configured to analyze the actions (e.g. through the audio, visual, and/or other data captured by the proxy device) performed by the dealer to identify the specified action. The proxy device can be configured to generate the dealer data in response to identifying the specified action.

For example, a dealer may perform a specified action indicating that no further wagers can be placed for the game (e.g. a "no more bets" or "stop bets" indication). The proxy gaming platform can be configured to prevent the remote user from submitting any further wagers in response to identifying the no more bets indication.

The specified action can be identified in various ways. For example, the specified action may be detected based on processing of the audio data and/or video data acquired by the proxy device. In a casino game such as roulette, a dealer may perform a predefined action (e.g. waving a hand over the table) and/or issue a verbal command (e.g. saying a signal phrase such as "no more bets"). The video data and/or audio data acquired by the proxy device can be processed to detect the standard action and/or verbal command.

Optionally, the game table location may also include table input device(s) usable to monitor game data. For example, a game table location may include one or more video input devices (see e.g. cameras 409 shown in FIG. 4B) and/or audio input devices (see e.g. microphone 407) shown in FIG. 4B. The data acquired by the table input device(s) can also be used to detect specified actions. The table input devices may also include manual dealer inputs, such as the buttons 408 shown in FIG. 4B. The dealer input buttons 408 may include game status buttons that allow a dealer to indicate game status data directly, such as a "no more bets" button, a "ball out" button, a payout button etc.

Optionally, the acquired data can be processed to detect a combination of a standard action and verbal command to detect the specified action. This may be particularly desirable in the context of a busy or noisy venue such as a casino to ensure that the action has been correctly identified.

Optionally, voice data from venue personnel can be acquired and stored by the proxy gaming platform. The voice data can be used to identify verbal commands from the specific venue personnel to ensure that the proxy device is responding to commands from the venue personnel rather than other participants or individuals at the game location. The voice data can be stored in a voice recognition database accessible to the proxy device and/or proxy gaming platform.

Optionally, the specified action can be identified based on (at least in part) signal data from a device used by or associated with the dealer. For example, the dealer may have a signaling device with an input (e.g. a pushbutton) that the dealer can engage to initiate the specified action.

Figure 4A:
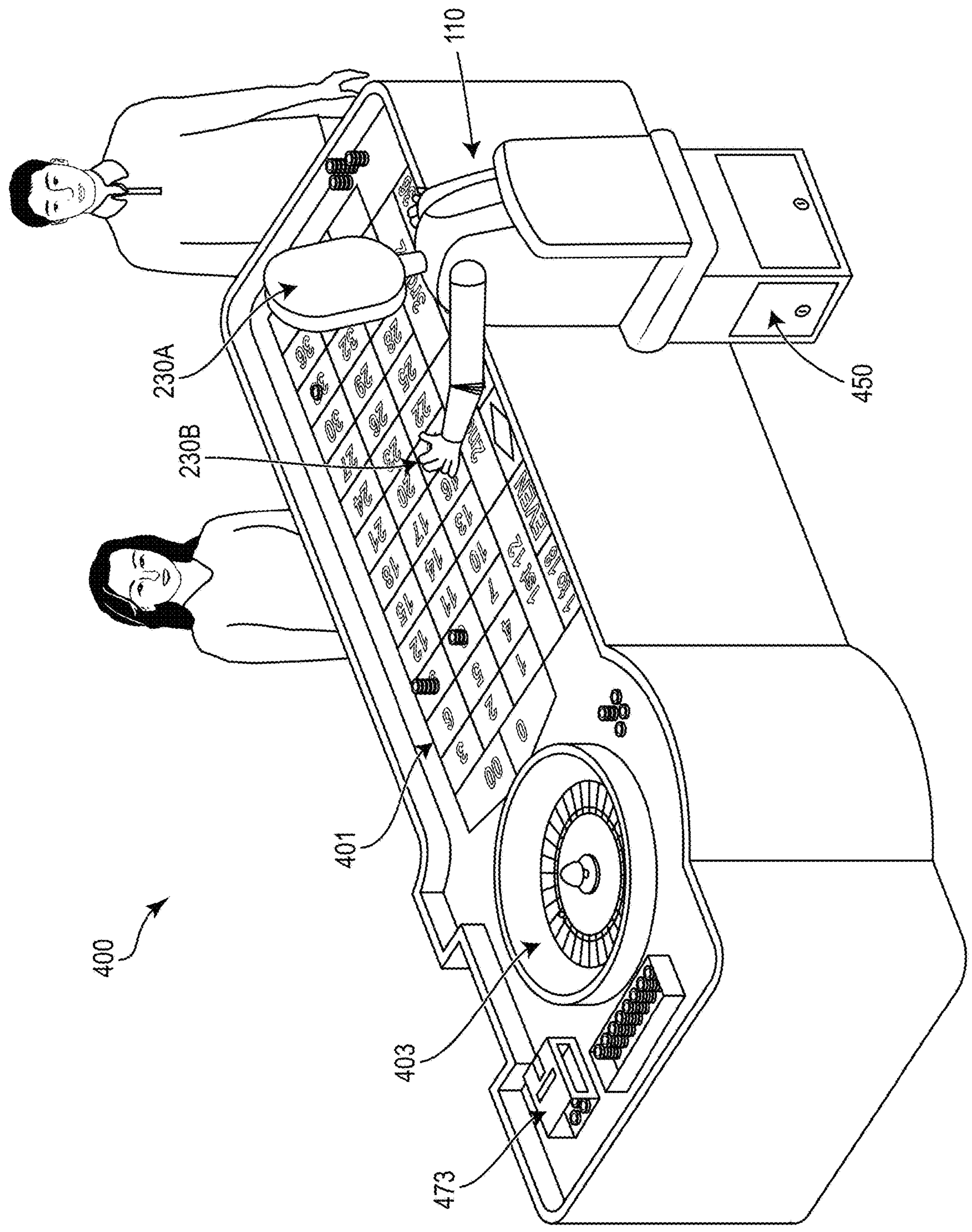
FIG. 4A is an example perspective view of a proxy device participating in an in-person casino game.

Alternatively or in addition, the signaling device may generate a specified action signal without requiring the dealer to intentionally activate the signaling device. For example, a signaling device may be integrated into an accessory worn by the dealer (e.g. a wristband or watch similar to the wristband 465 worn by the proxy device 110 as shown in the example of FIG. 4C). The signaling device can include an inertial measurement unit operable to monitor the motion of the dealer's arm, hand or wrist. The inertial measurement data can be analyzed to detect motion consistent with the specified action. The analyzed inertial measurement data can be used alone or in combination with other data to detect the specified action.

Alternatively or in addition, the signaling device may incorporate other data input devices such as a microphone. This may facilitate detecting verbal commands from the dealer, particularly within the context of a noisy gaming venue.

Optionally at 330, the proxy device can transmit environmental data to the user device. The environmental data can include various types of data relating to the venue and the venue environment around the game in which the proxy device is participating. For example, the environmental data can include audio and visual data acquired from the vicinity of the proxy device.

As noted above, the proxy device can include various input devices usable to acquire audio and/or visual and/or other data. The proxy device can be configured to use the input devices to acquire environment data relating to an environment of the game (e.g. the environment around the game and within the venue). The proxy device can then transmit the environment data to the user device (directly and/or via the one or more servers operating the proxy gaming platform). The environment data can be used by the remote user device to generate an environment output representative of the environment around the live in-person game. For example, the environment data can be used to generate a user interface that provides the user with audio and/or visual outputs reflecting the environment around the live in-person game.

In general, the environment data and game data can be used to generate interactive user interfaces that allow a remote user to participate in live in-person games. The particular format of the user interface can vary depending on the implementation and/or user device. For example, the user interface may take the form of a display screen shown on a user device such as a desktop, laptop, smartphone, or tablet device.

Alternatively, the game data and environment data acquired by the proxy device can be used to generate a virtual reality environment for a remote user. This may further enhance the user's engagement with the live in-person game while enabling the user to participate from a location of choice.

Optionally, the proxy gaming application 246 may enable a remote user to omit (e.g. mute) at least some of the environment data acquired by the proxy device from the interface provided by the remote user device. This may allow remote users to participate in the live in-person games while minimizing interruptions or distractions. When participating in-person at a game venue, it is typically not possible to minimize undesired environmental inputs (e.g. other players talking uninvited, hecklers, amateur players) that can be distracting and/or detract from the user's enjoyment of the game.

The proxy device can be configured to continue operating in the live in-person game despite a user minimizing or muting environmental inputs. That is, the proxy device can continue to perform the same interactions with a given in-person game while the remote user has deactivated one or more of the audio and/or visual feeds from the proxy device.

Optionally, the proxy device may not provide any indication that the remote user has muted the environmental data. Alternatively, the proxy device can provide an indicator (e.g. a light or other visual signal) indicating that the proxy device is operating in a silent mode. This can indicate to live participants that the remote user cannot hear them and may help prevent frustration from the live participants who may otherwise attempt to engage with the remote user via the proxy device.

The remote user can also deactivate audio and/or video communication from the user device to the proxy device. For example, a remote user may participate in the in-person game without maintaining a live video feed and/or a live audio feed (or at least without the proxy device outputting the video and/or audio feed).

At 340, the proxy device can receive control data from the user device. The proxy device can participate in the in-person game in response to the control data. A remote user can define the control data through a user interface in the proxy gaming application 226.

The control data can be defined to instruct the proxy device to perform one or more actions. The actions can include game-related actions that the proxy device can perform on behalf of the remote user. The proxy device can perform the game-related actions to participate in the in-person game on behalf of the remote user. For example, in response to the control data, the proxy device may perform one or both of optional steps 350 and 360.

The particular control data and actions performed by the proxy device can vary depending on the type of game in which the proxy device is participating and/or the current game state of the game (e.g. as determined from the game data received at 320). The proxy gaming application 226 can be configured to present an interactive user interface to the remote user that indicates the currently available actions that can be performed by the proxy gaming application.

Optionally, the control data can also include non-game-related control data. For example, the control data can include game selection data indicating that the user wishes to participate in a particular game type and/or a specific game of a particular game type (e.g. a particular table or a particular slot machine). The proxy device can then perform necessary actions (e.g. moving to a corresponding game location within a venue, interacting with the game device or dealer to initiate participation in the game, etc.) to participate in the selected game in accordance with the game selection data.

Optionally, the non-game related control data can include environmental output data defined by the remote user. For example, the environmental output data can include audio or visual communication data (i.e. allowing the user to speak to and/or visually communicate with other players) from the remote user to other participants in the game (including live participants). This may allow the remote user to communicate with those other players to further enhance the user's experience while participating remotely.

The environmental output data may also include user representation data usable by the proxy device to provide a representation of the user participating in the game. For example, the proxy device may display a user representation while the game is ongoing. Optionally, the user representation can be defined based on video data showing the user acquired from the user device while the game is ongoing. For example, the user representation may be a live video stream captured by the remote user device showing the user while the game is ongoing.

Optionally, the user representation may be generated as an avatar representing the user. The avatar may be configured to operate in a generic manner in response to game control data provided by the remote user device. Alternatively or in addition, the avatar can be defined at least in part based on the video data showing the user acquired from the user device while the game is ongoing (e.g. similar to a Bitmoji avatar).

Optionally, at 350, the proxy device can place a wager in response to the control data received at 340. The control data can include wager data relating to the in-person game in which the proxy device is participating. The proxy device can then make a wager in the game based on the received wager data. The specific size, type, and timing of the wager can vary depending on the game type and the current game status as well as the remote user's desired wagering strategy or desired wager.

Optionally, a robotic proxy may be configured to allow multiple remote participants to participate in a casino game using the same robotic proxy. This may allow multiple secondary remote participants to piggyback on the play of a primary remote participant.

The proxy gaming platform may receive additional wager data from an additional remote user device, the additional remote user device corresponding to an additional user. The additional wager data can be transmitted to the proxy device. The proxy device can then make an additional piggyback wager in the game in response to the additional wager data. This can enable an additional user to participate in the game by piggybacking on the participation of the remote user device.

Alternatively, the robotic proxy device may be restricted to a single remote participant. For example, certain game types may only be suited to a single participant.

The proxy gaming platform may also enable a user to define automated wagering rules for the proxy device. This may allow a user to continue participating in the live game even while not actively using the user device (e.g. while in transit between a venue and a different location). For example, a user can define auto-bet data through their user device. The auto-bet data can include defined wagering rules that can be implemented by the proxy device on behalf of the remote user.

The auto-bet data can be transmitted from the user device to the proxy device (e.g. directly and/or via one or more servers providing the proxy gaming platform). The proxy device can be configured to make a plurality of automated wagers in the casino game in response to the auto-bet data. The automated wagers can be defined according to the user-specified set of wagering rules in the absence of additional instructions (e.g. in the absence of the user intervening to remove or adjust the auto-bet rules. The nature of the auto-bet data and the associated wagering rules can vary depending on the type of game in which the proxy device is participating.

Optionally, the auto-bet data may be implemented as a prerequisite to a user reserving a proxy device. For example, a user may be required to define wagering rules that can be implemented by the proxy device when reserving the proxy device for a specified time. This can ensure that the proxy device is actively engaging in gameplay at the specified time, even if the remote player is not present at their user device at that precise time. This may encourage venues such as casinos to allow users to reserve proxy devices by ensuring that wagers will be placed at the reservation time.

Defining auto-bet data for a proxy device may also be beneficial in allowing a user to participate in a live in-person game both remotely and in-person. For example, a user may wish to participate at a specific game table or even a specific seat (e.g. a lucky seat or lucky table or lucky slot etc.). The user may reserve a proxy device for when the game table or seat becomes available. To ensure that no other players occupy that table or seat, the proxy device can be configured to operate according to the user's predefined wagering rules. This may provide the user with time to travel to the table or seat and participate in person.

For example, a user may define wagering rules that can be implemented when the user's desired combination is available to ensure that the user is able to take advantage of the availability. The user can initiate the auto-bet state in response to a user prompt received from the proxy gaming platform. The user may also then begin to travel to the game location in response to the prompt in order to participate in person.

The proxy device can be configured to perform a wager action in various ways. For example, a proxy device can output an audio wager direction to a dealer who can in turn place the wager on behalf of the proxy device (and in turn on behalf of the remote user). The audio wager can be a direct output of a verbal command captured by the user device from the remote user. Alternatively or in addition, the audio wager can be generated in response to the user input (e.g. translating/clarifying a user verbal input, converting another user input such as a mouse click into a verbal output etc.).

Alternatively or in addition, the proxy device can include one or more wagering adaptations. A wagering adaptation generally refers to an electronic or mechanical system or component that enables the proxy device to place a wager for one or more games. Examples of wagering adaptations include a chip handler or dispenser (e.g. such as the chip dispenser shown in FIGS. 5A and 5B), an electronic chip system, electronic chip handler (e.g. the electronic chip handler 1185 shown in FIG. 11) an electronic coupling for a slot machine, and so forth.

At 360, the proxy device can generate a game action output in response to the control data received at 340. A game action output generally refers to any sort of action or output performed by the proxy device in relation to the game that is not a wager. The type of game action output performed by the proxy device can vary depending on the nature of the game being played as well as the current game state. Examples of game action outputs can include a hit action in a blackjack game (i.e. asking the dealer to add a card), a fold action in a poker game.

PROXY DEVICE

The following is a description of a proxy device that may be used by itself in any proxy gaming system or in any combination or sub-combination with any other feature or features disclosed herein.

In accordance with this aspect, there is provided a device for enabling remote participation in games occurring live at a venue. For example, the device (referred to as a proxy device) can allow a remote user to participate in live casino games occurring at a casino even while the user is not present at the game location or even the venue.

Broadly speaking, the proxy device includes a structure or base that is positionable at a gaming location for a particular game type within a venue. The proxy device can include one or more input capture units capable of acquiring game status data relating to a playing environment of the particular game. For example, the proxy device can include a video camera configured to acquire video data from the playing environment around the proxy device. Game status data relating to the game can then be determined from the video data.

The proxy device can also include one or more output units. The output unit(s) can be positioned to engage with the playing environment of the particular game. That is, the output unit(s) can be positioned to allow the proxy device to perform any actions relating to, or required to, participate in the game.

The proxy device can also include one or more processors and one or more communication interfaces. Game data relating to a status of the particular game can be acquired using the at least one input capture unit. The game data can be transmitted to a remote user device via the communication interface.

Control data can also be received from the remote user device via the communication interface. The control data can define instructions for the proxy device to participate in the game. The proxy device can then perform various game-related actions in response to the control data received from the remote user device. For example, the control data can include wager data for a casino game occurring within a casino. The proxy device can operate the output unit(s) to place a wager in the casino game using the wager data contained in the control data received from the remote user device.

Proxy Input and Output Units

The proxy device can include various combinations of input unit(s) and output unit(s). In general, the proxy device can be configured to include a combination of input unit(s) and output unit(s) that enable the proxy device to acquire game related data sufficient to provide a remote user with game status data indicating the current status of a live game and to allow the proxy device to perform any necessary actions in order to participate in the live game on behalf of the remote user. The particular combination of input and output units can vary depending on the implementation and/or the particular game in which the proxy device is participating.

The robotic proxy can also include one or more output devices. The output devices can be used to provide various outputs in response to control signals from the remote participant.

The output devices may include one or more visual output devices that can be used to provide a visual indication of an input from the remote participant, such as a signal command relating to the casino game being played. Some output devices may include one or more visual output devices that can be used to provide a visual indication of an input from the remote participant like wager commands (e.g., hit, pass, double down, double for less or split etc.)

The output unit(s) can be defined to enable the proxy device to interact with the live game and/or other individuals and/or proxies located at the game venue. For example, the output unit(s) can be defined to allow the proxy device to perform game-related actions such as placing wagers or other game action outputs.

The output unit(s) can include one or more audio output devices such as a speaker. The proxy device can use the audio output device to provide audio outputs related to participation in the game. For example, the proxy device can be configured to output an audio wager for a casino game through the speaker to control data from a remote user device. The proxy device can also perform other game related actions using the audio output device.

The proxy device can also use the audio output device to communicate with other individuals at the venue, such as other players and/or the dealer. This may allow remote players to participate in the social aspect of live in-person games along with the live participants located at the venue. For example, the audio output device (in combination with a microphone provided by the remote user device) may also allow the remote participant to communicate with dealers, pit bosses, slot or video machine attendants, friends or other players who are present and participating in-person. A remote user can speak directly to other individuals at the game venue using the output devices of the proxy device.

The output unit(s) can include one or more visual output devices such as a display device. The display device can be provided in various forms, such as an LCD or LED screen, one or more indicator lights (e.g. LEDs), a projector, and/or other visual display device. The visual output devices can be used to provide a visual indication of an input from the remote participant such as wager commands (e.g., hit, pass, double down, double for less or split etc.) related to the casino game being played.

The proxy device can use the visual output device to provide visual outputs related to participation in the game. For example, the proxy device can be configured to visually display a wager for a casino game using the display device in response to control data from a remote user device. The proxy device can also perform other game related actions using the visual output device.

The output device can output audio and/or video captured from the remote user (e.g. via a camera or microphone coupled to their user device). Alternatively or in addition, the output devices can output signals that are defined in response to control data from the remote user. For example, the visual output device can be configured to display various visuals signals (e.g. lights in different colors, patterns of light signals etc.) and/or the audio output device can be configured to output various audio signals (e.g. different betting sounds) for different types of wager commands or other game related actions.

Optionally, the proxy device can display a written command on a visual output device to indicate to the dealer and other players the actions being initiated by the proxy device.

The proxy device can also use the video output device to communicate with other individuals at the venue, such as other players and/or the dealer. For example, the video output device can provide a real-time video link between the remote user and the venue. This can allow the remote user to have a visual presence at the live in-person game. This may further enhance the ability of remote players to participate in the social aspect of live in-person games along with the live participants located at the venue.

The proxy device can output a user representation of the remote user to enable the user to have a visual presence at the in-person game. The user representation can be generated in various manners, such as a live video stream captured by the remote user device showing the user while the game is ongoing and/or an avatar representing the user for example. The avatar may be generated using image data from a real person and/or a virtually generated avatar that is a human-like.

The proxy device can also include output indicators relating to a current state of the proxy device. The proxy device can include an in-use indicator such as a display screen and/or a light indicator. For example, the in-use indicator can display a first signal (e.g. a static blue light) indicating that the robotic proxy is in use by a remote user and a second signal (e.g. a flashing green light) indicating that the robotic proxy is not currently in-use and is available to be used. It should be apparent that various alternative signals and combinations of signals (e.g. different color lights, signal shapes, written status indicators and the like) can be used to provide an indicator of the proxy device status.

As noted above, the visual output device(s) can include a projector. The proxy device can be configured to project a wager for the casino game onto a playing surface of the casino game. This may be particularly useful where the proxy device is participating in a game that requires wagers to be positioned at specific locations of the game table (e.g. roulette or craps). The projector may also be used to output various other commands relating to the game.

The proxy device can also include one or more physical output devices. A physical output device generally refers to a unit or device that enables the proxy device to interact with tangible elements at a gaming location, such as chips, cards, table surfaces, slot machine inputs etc. Examples of physical output devices include various game-specific adaptations, such as those shown and described in FIGS. 4A-8C and 13. Optionally, a physical output device may include touch elements enabling the proxy device to interact with touch-sensitive input surfaces at game locations such as touch-screens for example.

The proxy device can include one or more input devices. The input devices can be configured to obtain data relating to the casino game and casino environment that can be provided to the remote participant.

The input devices can include one or more image capture devices (e.g., video cameras or still image cameras) operable to capture video of the casino game being played. The video data can be transmitted to the remote user device to provide the remote user with a visual display of the in-person game. The video can be displayed to the remote participant through a display coupled to their user device.

The video data acquired by the proxy device can also be analyzed to detect game-related data. For example, image identification processes can be implemented to identify the cards (and bets etc.) currently in play in a casino game. The image processing can be performed by one or more of the proxy device, proxy gaming platform, and/or user device.

The image capture devices can be mounted to the proxy device in a fixed or removable configuration. A movable image capture device can provide the proxy with increased flexibility to capture video data relating to the ongoing game and the associated environment. The position and orientation of the image capture device can be adjusted in response to control data from the remote user device.

Alternatively or in addition, the position and orientation of the image capture device can be adjusted automatically. For example, the image capture device may be automatically adjusted based on the location of the proxy device and/or the current state of the game. For example, a proxy device participating in a roulette game may identify a wagering state in which the image capture device can be positioned to face the betting layout and a spin state in which the image capture device can be positioned to face the wheel.

The input devices may include one or more sound capture devices (e.g., one or more microphones) to capture audio of the casino environment. The audio data can be transmitted to the remote user device to provide the remote user with an audible output of the in-person game and associated environment. The audio can be output to the remote participant through a speaker or other audio output device coupled to their user device.

The position and orientation of the sound capture devices can also be adjusted in response to control data from the remote user device. For example, the user may specify that the sound capture devices be positioned to capture data from a particular individual (e.g. the dealer) rather than the general environment.

Alternatively or in addition, the position and orientation of the audio capture device can be adjusted automatically. For example, the audio capture device may be automatically adjusted based on the location of the proxy device and/or the current state of the game. For example, the audio capture device may be adjusted to face a particular user who is wagering in a round of poker.

The proxy device can also include input devices that enable a live person to provide input directly to the proxy device and/or the remote user via the proxy device. For example, the proxy device can include input devices such as a keyboard, touchscreen display, pushbutton(s) and the like. Such user-engageable input devices can be used to generate input signals to be transmitted to the remote user, e.g. to prompt a user to provide control data relating to the ongoing game and/or to initiate communication with the remote user.

The user-engageable input devices can also allow venue employees to provide inputs relating to the game in which the proxy device is participating. For example, a dealer can provide inputs to the proxy device relating to wagers won by the proxy device. This may allow the dealer to transfer value from live players to the proxy device. For example, a live player may participate in a live game using chips. However, the proxy device, proxy gaming platform and remote user may track and manage their value electronically. For instance, the proxy device may not use chips and/or may use electronic chips rather than standard casino chips.

Accordingly, the dealer may use the input device(s) to transfer value from the live players to the proxy device/remote user and vice versa. The dealer may retain chips won from the live players or distribute chips to live players based on wagers made by the proxy device in cases where the proxy device does not use standard chips.

The user-engageable input devices may also allow users to perform various operations on the proxy device, such as diagnostics, maintenance, procedures, inserting real money, and so forth. For example, the user-engageable input devices may enable the proxy device to be updated and maintained, e.g. when accessed by a technician or other maintenance worker.

The various input and output devices can be positioned on and/or mounted to the proxy device in different ways depending on the particular implementation. For example, one or more of the input capture units and/or output units can be height adjustable. This can allow the proxy device to acquire data and/or provide outputs at different levels depending on the height of a given game table or machine. Alternatively or in addition, adjusting the height of a given input unit and/or output unit can allow a remote user to control their view or how they communicate data to the in-person players and/or dealers.

Figure 6A:
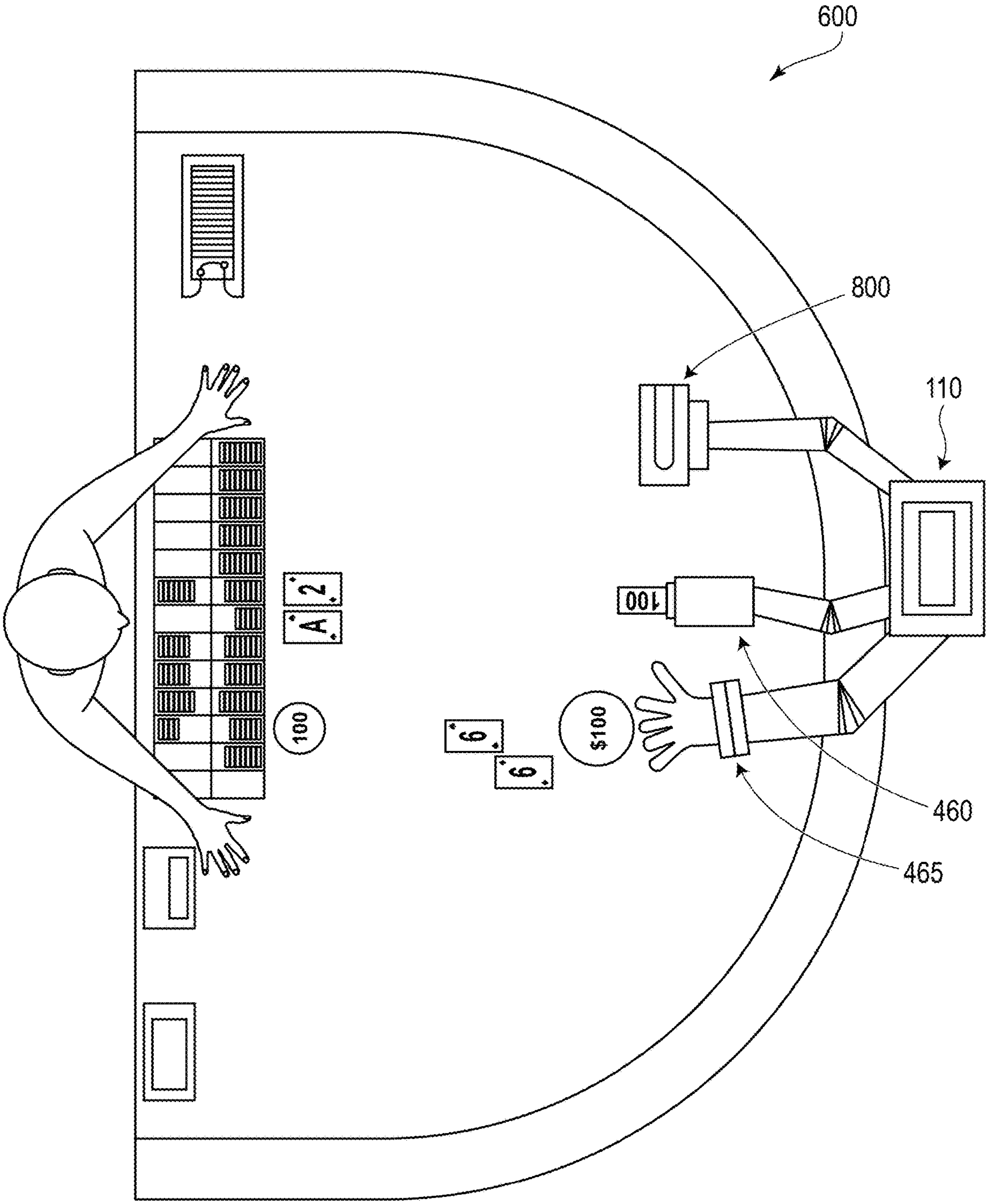
FIG. 6A is a top view of an example proxy device participating in another example in-person casino game.
Figure 6B:
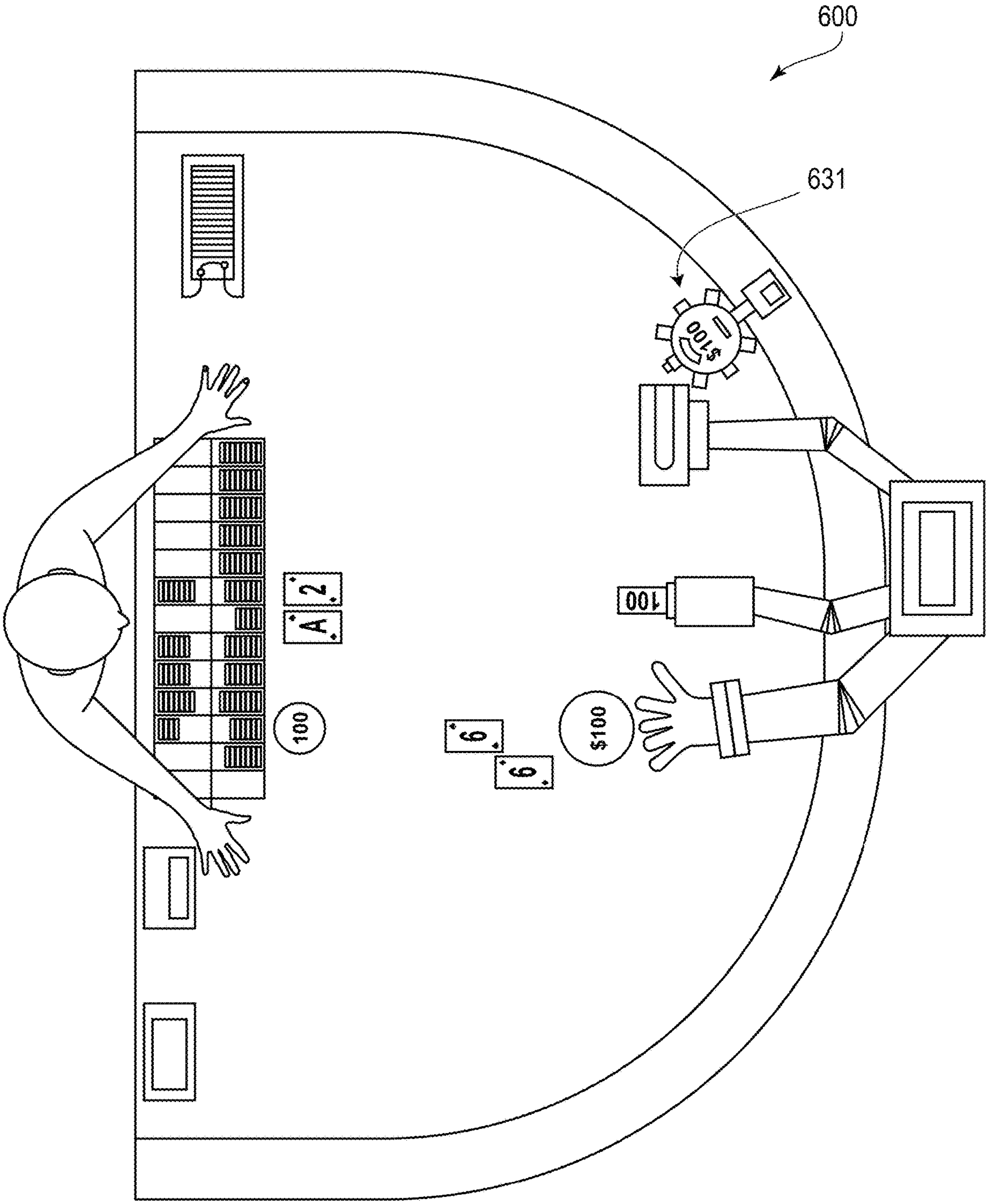
FIG. 6B is a top view of another example proxy device participating in another example in-person casino game.
Figure 7:
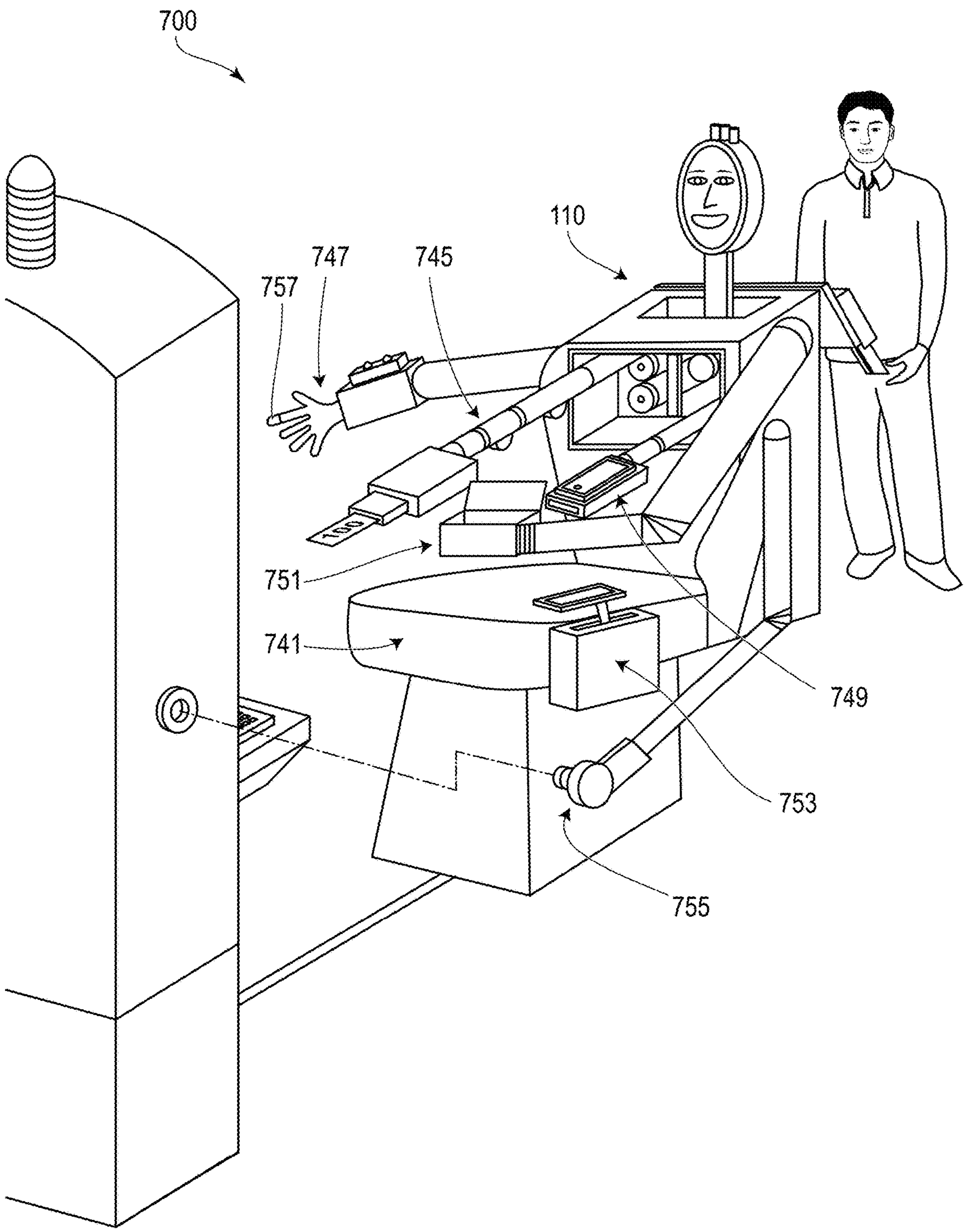
FIG. 7 is a perspective view of an example proxy device participating in another example in-person casino game.

The output device(s) can be mounted at various locations on the proxy device. For example, a visual output device can be mounted to the front of the proxy device (the side of the proxy device facing towards the game table or machine). This may be particularly useful in providing a dealer, attendant, or other players with visual outputs from the remote user. For example, a visual output device can be mounted to the chest or face of a proxy device shaped to resemble a human (e.g. as shown in the examples of FIGS. 4, 6, and 7).

Alternatively or in addition, a visual output device can be mounted to the rear of the proxy device (the side of the proxy device facing away from the game table or machine). This may be particularly useful in providing other individuals with status data relating to the proxy device (e.g. in-use data, maintenance related data, etc.).

Alternatively or in addition, a visual output device can be mounted to other locations of the proxy device such as the sides or an extension member such as an outwardly projecting arm. For example, the proxy device may include one or more arms that project outward from the body of the proxy device. A visual output device can be mounted to the arm (e.g. at a distal end of the arm, around an intermediate section similar to a wrist-mounted bracelet, etc.) to allow the output device to be positioned and adjusted as required or desired to participate in a given game.

As with the visual output device(s), audio output device(s) can also be mounted to various different locations of the proxy device, including the main body and extension members.

Figure 4B:
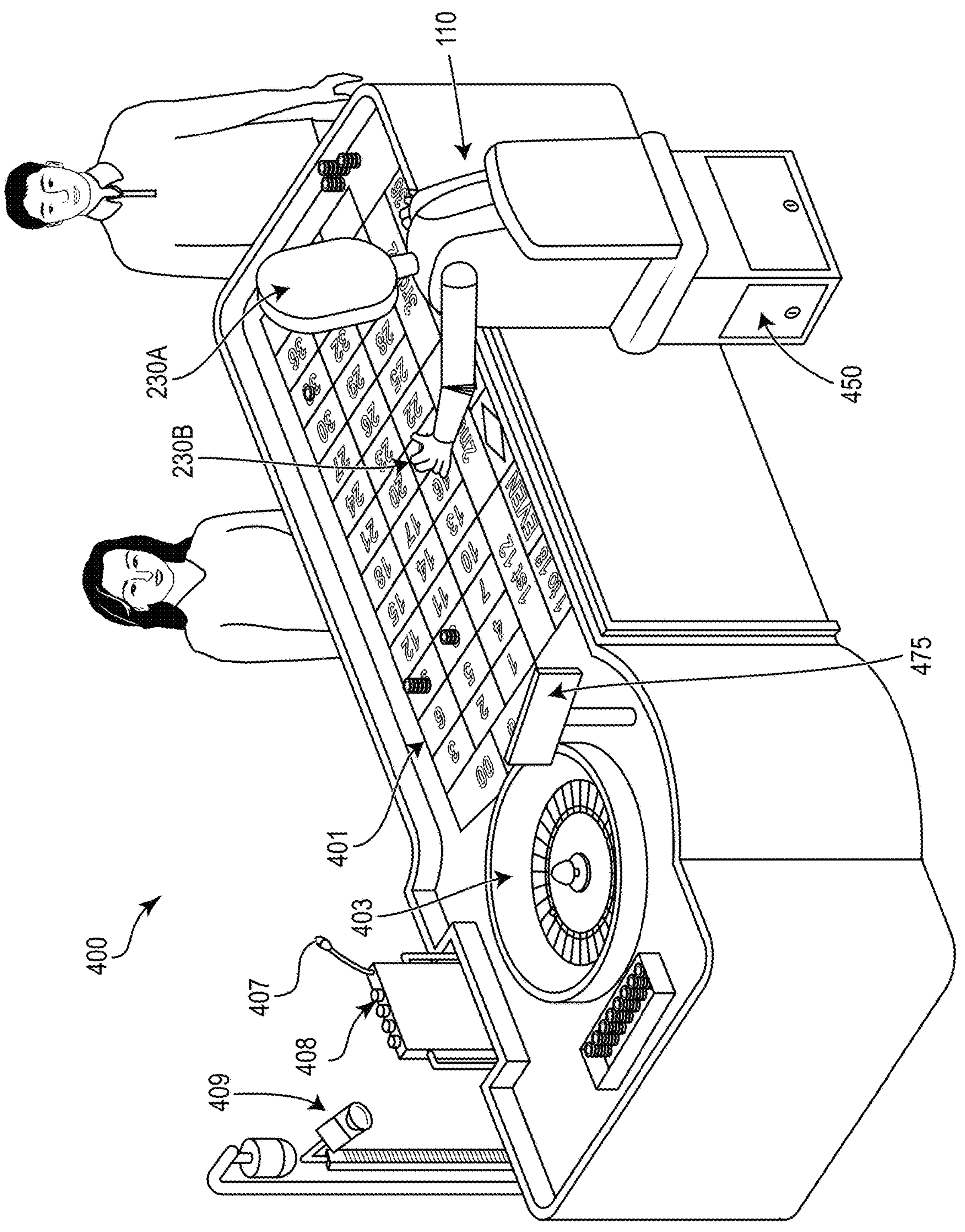
FIG. 4B is another example perspective view of a proxy device participating in the in-person casino game of FIG. 4A.
Figure 4C:
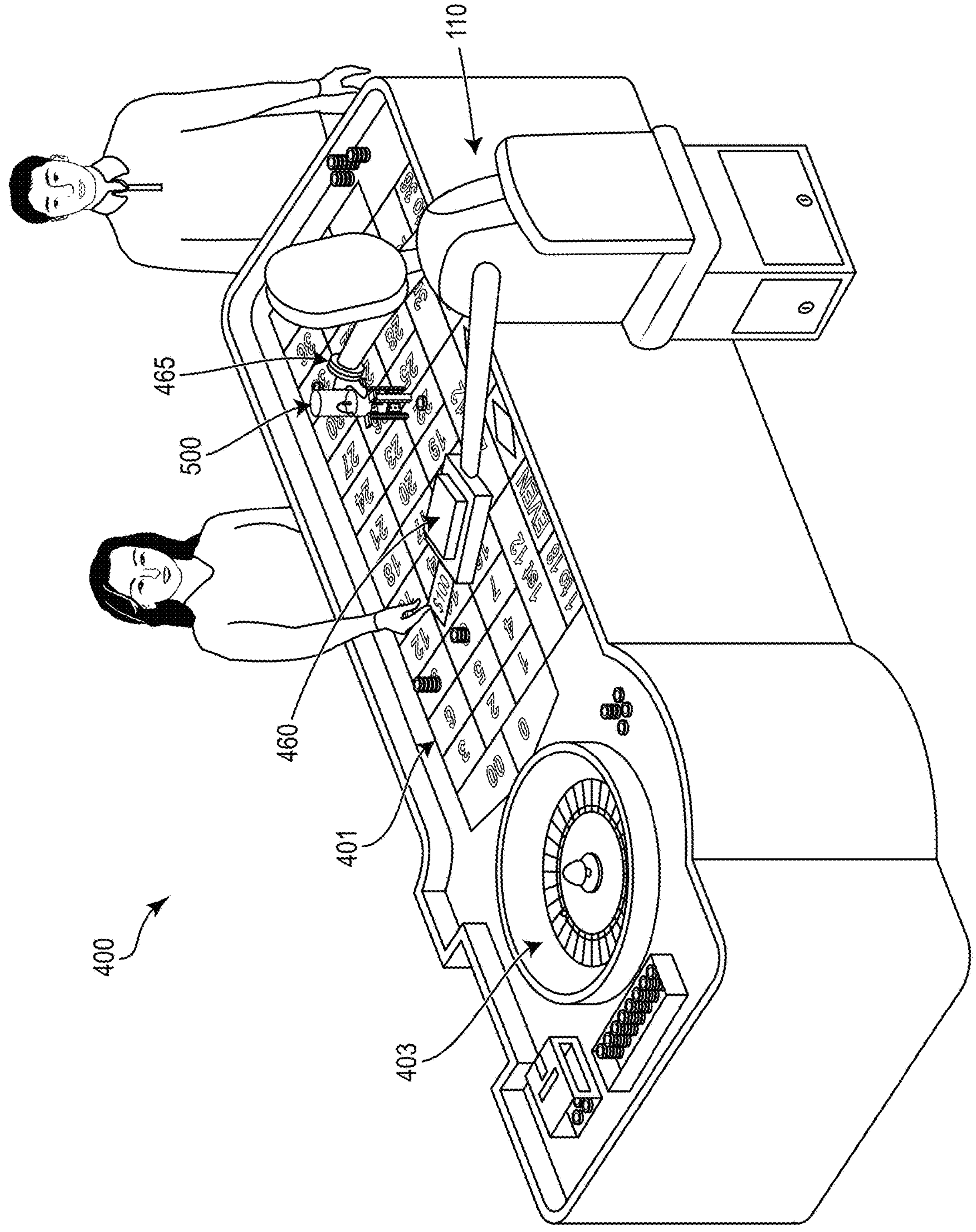
FIG. 4C is another example perspective view of a proxy device participating in the in-person casino game of FIG. 4A.

Optionally, the proxy device may communicate with input and/or output devices located at the game venue such as the microphone 407 and/or camera 409 shown in the example of FIG. 4B. For example, audio and/or video input devices (e.g. microphones, cameras etc.) may be positioned at the game location. The proxy device may communicate with the input devices located at the game location to obtain game-related data relating to the game status and/or environment of the game. This may allow the proxy device to obtain game related data from a perspective that may be difficult to obtain (or difficult to obtain without moving the proxy device) but is still relevant to the user's experience. This may also allow the proxy device to more easily identify game related actions performed by a dealer, such as visual or audio instructions relating to the game.

Optionally, an extension member or arm may be configured to extend and retract (e.g. in a telescopic manner). This can allow the position of an input and/or output device to be adjusted when positioned on an extension member.

Optionally, an extension member may be articulated to allow greater flexibility in adjusting the position of an input and/or output device. That is, an extension member can include multiple sections connected with flexible joints allowing the section of the extension member to tilt or rotate relative to one another.

Optionally, one or more input devices and/or output devices may be removable from the proxy device. This may allow the proxy device to be reconfigured to participate in different types of games that may require different types and/or different configurations of input and/or output devices.

For example, a proxy device may have mounting members to allow one or more input devices and/or output devices to be removably mounted thereto. Alternatively or in addition, the proxy device can include mounting members to allow extension members and/or game specific adaptations to be mounted thereto.

The mounting members of the proxy device can include coupling members (e.g. electrical and/or electronic couplings). The coupling members can be used to establish connections between the proxy device and the mountable members, such as removable extension members, input devices and/or output devices. For example, the coupling members can include communicative couplings to allow control signals to be provided to the elements (e.g. ultimately from the user device) being mounted and for feedback signals to be provided back to the proxy device (e.g. and ultimately to the proxy gaming platform and/or user device).

The proxy device and/or extension member can also include various position and environmental sensors operable to monitor the position of the proxy device and/or extension member relative to the environment of the gaming location.

For example, the proxy device and/or extension member may include proximity and/or collision detection sensors. The proximity sensors may be used to prevent the proxy device and/or extension member from colliding with objects or individuals at the venue and/or game locations such as the table, other individuals at the table, and/or chips positioned on or at the table location.

The proxy device and/or extension member can also include force sensors operable to detect forces applied to the proxy device and/or extension member. This may help ensure that the proxy device and/or extension member does not cause damage to itself, employee personnel, live participants, and/or other objects at the gaming location. For example, the proxy device 110 can be configured to reduce the pressure applied to an extension member in response to determining that an applied force is greater than a predefined safety threshold.

The proxy device can also include a chip holder or chip enclosure (see e.g. chip enclosure 751 in FIG. 7). The chip enclosure can be shaped to receive one or more casino chips.

When the proxy device is participating in a casino game, the proxy device may wager using casino chips. The proxy device may also acquire additional casino chips due to success in the casino game. These casino chips can be returned to the casino cashier to be exchanged for money. Even though the proxy device's winnings (or losses) can be monitored electronically, the casino chips still represent value that may be attractive to individuals at the game location. Accordingly, the casino chips can be stored in the chip enclosure to secure the casino chips and prevent loss or theft of the chips by individuals at the game location.

The chip enclosure can be configured as a secure (e.g. locked) enclosure to prevent unauthorized access to the casino chips. The chip enclosure can include various types of lock mechanisms including electronic and/or mechanical locks. Chips can be deposited into the secured chip enclosure to prevent unauthorized access to the casino chips.

The casino chips may have chip identifier data that enables the chips to be identified (e.g. visual markings, electronic identifiers etc). Optionally, one or more chips may be assigned to a particular player (e.g. a remote user operating a proxy device). The chips deposited into the chip enclosure may be tabulated for their total chip value amount for that particular player.

Optionally, the chip enclosure may be accessed by an authorized individual at the game venue (e.g. a pit boss, cashier, security personnel etc.). The authorized individual may use an access key (e.g. a physical key, key card, fob etc.) and/or an access code (e.g. a combination, keypad code, alphanumeric code etc.) and/or a biometric input to access the chip enclosure and retrieve the chips.

Alternatively or in addition, a user controlling the proxy device may access the chip enclosure to retrieve the chips if they are participating from the same game venue. The user may access the chip enclosure in various ways, similar to an authorized individual.

Optionally, the chip enclosure can include an access data input (e.g. a keypad, keyboard, touchscreen, fingerprint scanner, retinal scanner etc.) that allows a user or authorized individual to access the chip enclosure. The access data required to access the chip enclosure may be predefined (e.g. to ensure that only authorized individuals are permitted to access the chip enclosure).

Alternatively or in addition, a user may define access data that can be used while a game session is established between the user and the proxy device. This can allow different users to access the chip enclosure for periods of time when they have established a gaming session with the respective proxy device.

The chip enclosure may also allow a user to access chips won by the proxy device during a gaming session with that proxy device. For example, where a user wishes to participate in-person at the casino game and also remotely (e.g. before and/or after participating in person), the user may access the chip enclosure to retrieve chips won by the proxy device (on their behalf) and/or to store chips won by the user for subsequent use by the proxy device when the user is remotely controlling the proxy device.

Alternatively or in addition, a chip enclosure may be provided at the game table. For example, the chip enclosure may be secured to a table to provide a secure chip storage location that is protected against theft and/or tampering.

FIG. 4A illustrates an example of a chip enclosure 473 located at table 401. The chip enclosure 473 can be configured and operate in generally the same manner as a chip enclosure provided by a proxy device.

The chip enclosure 473 can be used to store chips that can be used by the proxy device 110 and/or that have been won by the proxy device 110. For example, the chip enclosure 473 may contain casino chips that have been won by a particular proxy device 110 in cases where the proxy device 110 participates in a game using electronic and/or virtual chips. This can provide a secure enclosure to manage chips won by the proxy device 110 without requiring the proxy device to handle and/or manage those chips.

The proxy device can generally include a communication interface to enable the proxy device to transmit data to other devices such as a proxy gaming platform, user device, and/or dealer device for example. The communication interface can include one or more wired and/or wireless communication units configured to operate according to various different communication protocols.

Proxy Structure

The proxy device can be provided in various different configurations. Various different shapes, sizes and structures of proxy devices can be used so long the proxy device is capable of acquiring data and providing outputs necessary for the remote participant to participate in a given live in-person game.

In some examples, a proxy device can be fixed at a specific gaming location (e.g. a specific game table or slot machine). For example, the proxy device can be fixedly fastened to a floor, chair or table at the game location. A user can establish a gaming session with a fixed proxy device in order to participate in a game at the corresponding gaming location. This may allow the proxy device to maintain a fixed, hardwired connection to the network infrastructure of the gaming venue to facilitate communication with a proxy gaming platform and/or remote user.

Furthermore, the proxy device may be capable of implementing additional security measures when in a fixed position. For example, the proxy device may include a chip enclosure that allows chips obtained by the proxy device to be transmitted (e.g. through appropriate ducting) to the cashier without requiring a user to access the chip enclosure. More generally, maintaining the proxy device in the fixed position can ensure that attempts to access, interfere or tamper with the proxy device can be more easily monitored.

Providing a fixed proxy device at a particular gaming location also ensures that the proxy device is arranged to facilitate interaction in the particular game that occurs at that gaming location. That is, the proxy device can be installed and positioned by a technician and calibrated to ensure that the proxy device's input and output devices are arranged and positioned optimally for the particular game and the particular gaming location (e.g. for a particular height of table, a particular field of view, etc.).

Alternatively, the proxy device may be positionable at a plurality of gaming locations within a gaming venue. For example, the proxy device can include a movable base. The movable base can enable the proxy device to move between different gaming locations within the gaming venue.

Alternatively or in addition, the proxy device may be movable between different gaming venues.

The proxy device can also include various tracking features to ensure that the location of the proxy device can be monitored. For example, the proxy device may include location detection systems using technologies such as LIDAR and/or global navigation satellite systems (GNSS) to track the location of the proxy device within and between game venues.

Optionally, the proxy device can include a wheeled base. The proxy device can then move between gaming locations using the wheels of the wheeled base.

Alternatively or in addition, the proxy device can include one or more track members. The track members can mate with a corresponding track or tracks at the gaming venue. This can enable the proxy device to move along the track between the gaming locations.

The track members may be provided on the base of the proxy device. Base-mounted track members can be positioned to engage a floor mounted track within the gaming venue.

Alternatively or in addition, the track members can be provided on one or more extension members that extend outwardly from the proxy device. For example, the track members can be provided on one or more upwardly extending extension members. This may allow the track members to engage with a corresponding ceiling mounted track.

Additionally or alternatively, the proxy device may include an electric motor. The electric motor can be operated to drive movement of the proxy device.

Optionally, the proxy device can include one or more locks usable to secure the proxy device to a particular gaming location. The one or more locks can be configured to mate with corresponding locking members provided at a particular gaming location. This can ensure that the proxy device remains at the desired gaming location while participating in a live in-person game.

Optionally, the proxy device can be adjusted between multiple configurations depending on the operational status of the proxy device. For example, the proxy device may be adjustable between an in-use position and a storage position.

In the storage position the proxy device can be adjusted to a more compact shape and/or size (as compared to the in-use position) to facilitate storage and/or transport of the proxy device.

In the storage position, one or more elements of the proxy device may be retracted or recessed into the body of the proxy device. For example, adjustable extension members can be adjusted to retracted positions and/or positions immediately adjacent the proxy device body in the retracted position to reduce the outer profile of the proxy device.

Input and/or output devices can also be adjusted to storage positions (e.g. retracted into a main body of the proxy device) in the storage position. The storage positions for the input and/or output devices can be defined to minimize possible damage to those devices during transport and/or storage (e.g. by protecting potentially fragile elements such as screens).

In the in-use position, the input devices and/or output devices can be adjusted to operational positions to allow the proxy device to participate in a particular game.

Optionally, the operational positions of the input devices and/or output devices may vary depending on the particular game in which the proxy device is participating. The proxy device can be configured to adjust the positions of the input devices and/or output devices based on the particular game and/or game location.

The height of the proxy device can be defined based on the expected height required for the gaming location(s) at which the proxy device is to be used. For example, the height of the proxy device may be defined to ensure that the input devices and/or output devices can be positioned at a height greater than an expected height of the gaming table.

The height of the robotic proxy may be defined to be greater than an expected table height for the casino games. In some cases, the height of the robotic proxy may be adjustable to allow the robotic proxy to participate in games with different table heights. Providing a height-adjustable robotic proxy may also facilitate storage and allow the robotic proxy to travel between gaming locations in a more stable manner (e.g., by moving while in a more compact storage position).

The proxy device can be provided in various shapes, including basic circular or rectangularly shaped display devices with integrated output devices. Such devices may be provided as proxy devices that are attached to a gaming location (e.g. mounted to a gaming table). These devices may not require the same height as other chair or floor-mounted proxy devices, since they can be mounted directly to a gaming table.

Optionally, table-mounted proxy devices may be fixed to gaming locations e.g. to prevent theft.

Alternatively, table-mounted proxy device may be removably mounted to gaming locations to allow them to be positioned at different gaming locations as required. However, moving these proxy devices between different gaming locations may require a user to carry or otherwise transport them between gaming locations.

Optionally, a table mounted proxy device may be fixed at a specific seat location at the table.

Alternatively, a table-mounted proxy may be movable between different seat locations at the table. Optionally, the table-mounted proxy device may be movable while remaining attached to the gaming table.

For example, the gaming table can be modified to incorporate a track system for the table-mounted proxy device. The table mounted proxy device may then be moved between different seat locations at the table by travelling along the track. The proxy device may be adjustable to a compact position when being moved so as not to interfere with the game or other individuals at the gaming table (e.g. avoid hitting other players or chips).

The table-mounted proxy device may be manually movable between different seat positions at the gaming table. This may require venue personnel such as a dealer to adjust the position of the table-mounted proxy device.

Alternatively, the table-mounted proxy device may be automatically movable e.g. in response to a command from the remote user device. Optionally, the proxy device can output warning signals such as flashing lights or beeps indicating that the proxy device is moving or is about to move. This may alert venue personnel and/or other participants to the movement of the proxy device so they can avoid being interfered with.

The movable proxy device can be locked and secured to the table in a given seat location. This may ensure that the proxy device cannot be moved or tampered with during an ongoing game.

The table-mounted proxy device can be configured as a low-profile device that does not occupy a large region of the table. For example, a proxy device may be as small as 8-9 inches wide by about 2-4 inches high. Such as a low-profile proxy device may ensure that the proxy device does not interfere with the ability of other players to see the table, their chips, the dealer or other players. This may allow remote users to participate in table games remotely without reducing the capacity of in-person players. However, such a proxy device may be limited in its ability to participate in the game (e.g. limited to audio and video outputs for example).

Alternatively, the proxy device can be provided in a generally humanoid form with a central body, upper portion (e.g. resembling a head), and outwardly extending limbs (e.g. extension members). Alternatively, the proxy device can be provided in a humanoid or partial-humanoid form (e.g. having a head, or a torso and head, mounted on a base). The humanoid form may include an output device usable to provide a user representation on the upper portion (i.e. head) of the proxy device.

Alternatively, the proxy device can simply include an electronics enclosure containing the various input and output devices and optionally one or more extension members.

Optionally, the proxy device may be chair-mounted (see e.g. FIGS. 4A-4C). That is, the proxy device can be mounted or secured to a chair at a gaming location. The proxy device can then extend upwardly from the chair to the height necessary to participate in a given game. The proxy device can be removably mounted to the chair to allow in-person players to use the chair when the proxy device is not in use.

Alternatively, the proxy device may include or be integrated with a player chair (see e.g. FIG. 7). This may allow a live player to use the chair when the proxy device is not in use without requiring the proxy device to be removed. This may also facilitate multi-mode play for a user, e.g. where they can continue participating in the same game while in-person and also using through the proxy device at the chair location through their user device.

A proxy device integrated with a player chair 741 may include retractable input and output devices (e.g. retractable device 743) and retractable extension members (e.g. retractable arm 745). This can allow the proxy device to convert between an in-use position (where the proxy device is participating in the game on behalf of a user) and a compact storage position that allows an in-person player to participate in the game directly while sitting on the chair.

Optionally, a player chair can be included on the rear side of the proxy device (i.e. the side spaced away from the gaming table). This may allow an individual to sit on or adjacent to the proxy device while the proxy device participates in a game.

The proxy device can include one or more power sources. For example, the proxy device can include an electrical connector usable to connect the proxy device to mains power. The proxy device can then operate using mains power when plugged in. This may facilitate construction of the proxy device, particularly where the proxy device is intended to be fixed at a gaming location.

Alternatively or in addition, the proxy device can include one or more onboard energy storage members (e.g. batteries, capacitors, ultracapacitors etc.). This can ensure that the proxy device remains operational even without an electrical connection to mains power. This may be particularly useful for proxy devices that are movable between gaming locations and/or gaming venues.

Optionally, the proxy device can include one or more device identifiers. The device identifiers can be used to uniquely identify the proxy device. For example, the proxy device can include a visual or electronically identifiable identifier (E.g. a serial number, barcode, etc.). Optionally, each of the output units, input units, and/or extension members that may be removable from the proxy device can include identifiers as well to ensure that they can be readily tracked.

Movement of the input/output devices and/or extension members can be controlled using various different types of motors and rotary or linear actuators. Electronic servos can be used to control and adjust the positioning of the input input/output devices and/or extension members.

Alternatively or in addition, the proxy device can include mechanically adjustable positioning members. This may operate as an alternative to electronic motors and/or a backup in the case of motor failure. The adjustable positioning members can be used to adjust the input/output devices and/or extension members to fixed positions for participation in a game. The adjustable positioning members can also include locking fasteners to maintain the input/output devices and/or extension members in a desired position.

Proxy Device Wagering System

As mentioned herein above, the proxy device can participate in games involving wagering such as casino games. In-person participants at casinos typically wager using chips. Each casino chip is associated with a monetary value and the chips can be redeemed for that monetary value at a cashier within the casino.

However, a proxy device does not require a user to be physically present at a casino in order to participate in the casino game. It may also be impractical to require a user to navigate their proxy device to a cashier cage within the casino in order to acquire and redeem casino chips. Accordingly, a remote user may insert or remove funds from their account electronically on the proxy gaming platform. This can introduce challenges when the proxy device is participating in casino games alongside in-person players who wager and collect winnings through the use of casino chips.

Optionally, the proxy device may participate in a casino game using an electronic chip system and/or virtual chip system. For example, a proxy device may have one or more electronic chips accessible to and/or associated with that proxy device. Each electronic chip can have a display output or display surface usable to display the value of the proxy device's current wager. This may allow the proxy device to participate in casino games while limiting the number of chips that the proxy device is required to manage (e.g. handle or store).

In some cases, the electronic chip can have generally the same shape and size as a regular casino chip. This may ensure that the electronic chip can be used in a variety of casino games with minimal interference with other players.

Furthermore, the use of the electronic chip may enable increased participation in casino games by reducing the clutter of chips that must be wagered for larger bets. The actual value retained by a player (live player or proxy device) can be tracked electronically. When wagers are being made, an electronic chip may represent various different values depending on a given wager. Instead of requiring a dealer to maintain a tray with multiple different kinds of chips (e.g. multiple colors associated with different values) and many chips of each kind (e.g. 300-400 chips for each kind of 8 different kinds of chips), the dealer can manage a significantly reduced number of electronic chips.

Alternatively or in addition, the proxy device can display wagers through a visual output device such as a display screen or projector. In such an implementation, the proxy device may not handle any chips whatsoever. For casino games where participants wager against one another, this may place an additional onus onto the dealer or pit boss to manage the chips of the in-person players (e.g. removing chips from the table when the proxy device wins or paying out chips to the in-person players that correspond to the wager output by the proxy device).

Optionally, the proxy device may be configured to project a chip image onto the gaming table to reflect a wager output. This may be particularly useful for games such as roulette or craps, where the wagers are placed at specified locations on the gaming table. This may also allow the proxy device to project as many or as few wagers as desired without requiring a significant number of different chips or electronic chips.

Optionally, the game table location can include one or more table output units such as a table display devices. An example table display device 475 is shown in FIG. 4B. For example, the table display device may be mounted to the tabletop, hung above or nearby the table, or otherwise positioned to be visible to players and/or proxy devices participating in a game at the game table location.

The table display device may allow the virtual wagers placed by a proxy device and/or remote user to be shown to the other participants by displaying those wagers on the screen. For example, the display screen may provide a virtual display of the gaming table with the virtual bets (and optionally the live bets) overlaid on the gaming table.

In the example shown in FIG. 4B, the table output unit is a table display 475. Alternatively or in addition, the table output unit may include a table projection system operable to display wager data projected at the gaming table location (e.g. onto the game table surface).

The proxy device can also include one or more payout input devices. That is, a dealer of a casino game may interact with an input device (e.g. touch screen, keypad etc.) on the proxy device to define a payout to the proxy device as a result of a given game.

The proxy device can also include a funds transfer unit. The funds transfer unit can receive funds (or data indicating the value of funds) related to the outcome of the game (e.g. the payout). The funds transfer unit can then electronically transfer funds corresponding to the payout into an account associated with the user following completion of the user's participation in the game. For example, the funds transfer unit may allow electronic funds transfers to and from the proxy device including tap-based payments.

The payout to the proxy device can be provided to the user account of the remote user via the proxy gaming platform. This can allow the remote user to obtain the payout from their participation in the in-person game without requiring the remote user to manually convert the chips (won by the proxy device) to real currency. The chips can then be stored in a secure chip enclosure (e.g. provided by the proxy device and/or the game venue/location) to be later returned to the venue cashier. Optionally, the chips may be reusable by the proxy device (or another proxy device at the same location), e.g. in response to the same or a different remote user inputting value into their user account for use by a proxy device in an in-person game.

Depending on the size of the payout, additional authorization (E.g. from an authorized individual such as a pit boss or floor supervisor) may be required to allow the payout to be completed. Authorizing such payouts may require the authorized individual to authenticate the payout by submitting authentication data (e.g. a password, biometric, or key card).

Optionally, the proxy device can include a cash output or dispenser device (see e.g. cash dispenser 460 shown in FIG. 4C). The cash dispenser may be usable by the proxy device to provide a buy-in to a casino game at a game location. The cash may allow a dealer to issue chips to the proxy device in exchange for the cash provided by device 460. A cash dispenser may also be used to enable a proxy device to play a slot game (see e.g. FIG. 7). This may facilitate use of the proxy device with existing slot machines that include cash acceptors.

Alternatively or in addition, the game table location may include a dealer input unit. The dealer input unit can be used to identify whether a proxy device and/or remote user has won a wager. The dealer may interact with the dealer input unit to indicate the results of a wager. The winnings and/or losses can then be added to or deducted from the user's account electronically. Optionally, the dealer input unit may be combined with a chip enclosure.

Alternatively or in addition, the proxy device may be configured to participate in casino games using casino chips similar to other in-person participants. Accordingly, the proxy device can include one or more chip handling components that allow the proxy device to pick-up and place chips as required.

Figure 5A:
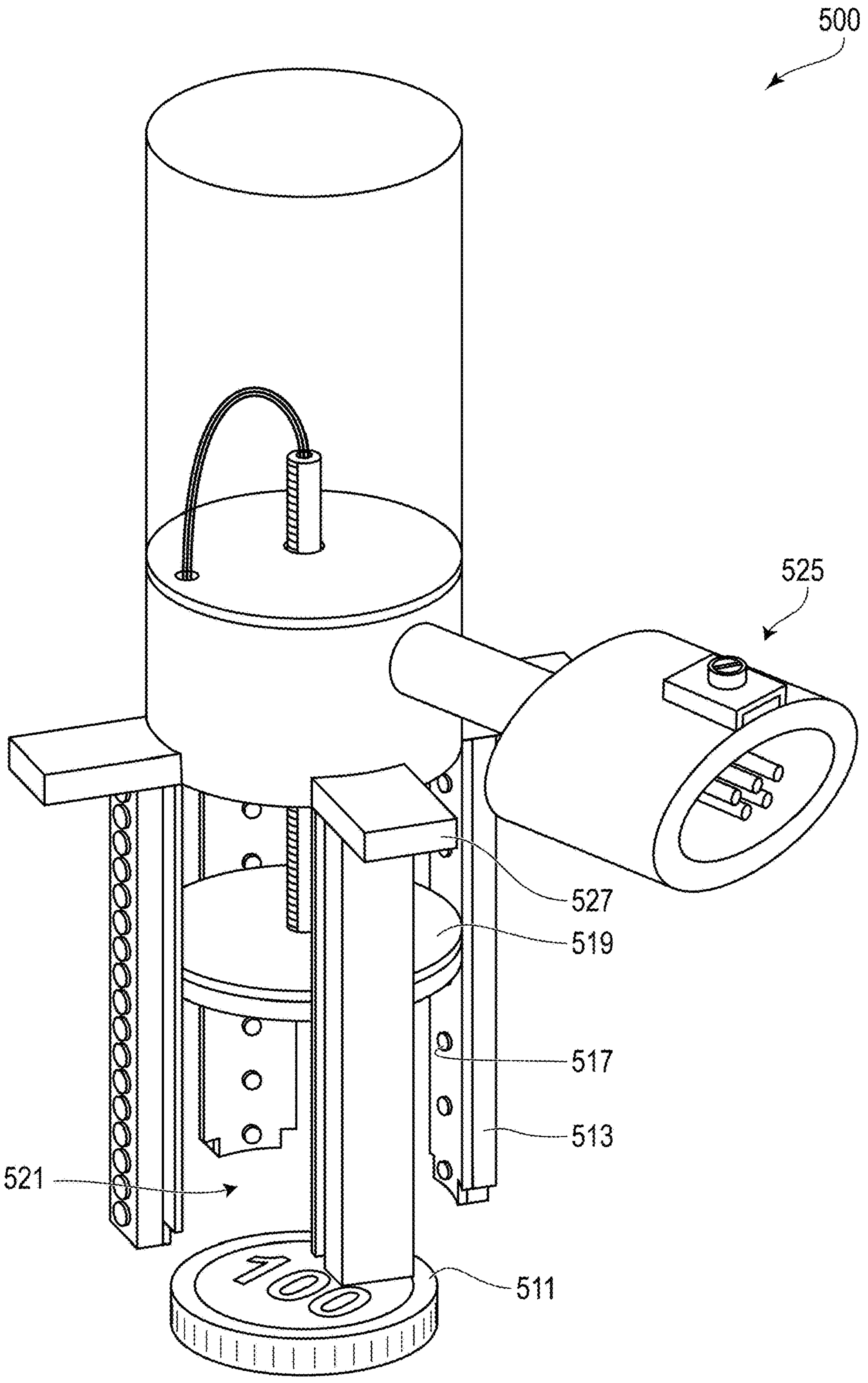
FIG. 5A is a perspective view of an example device for handling casino chips that may be used with an example proxy device.
Figure 5B:
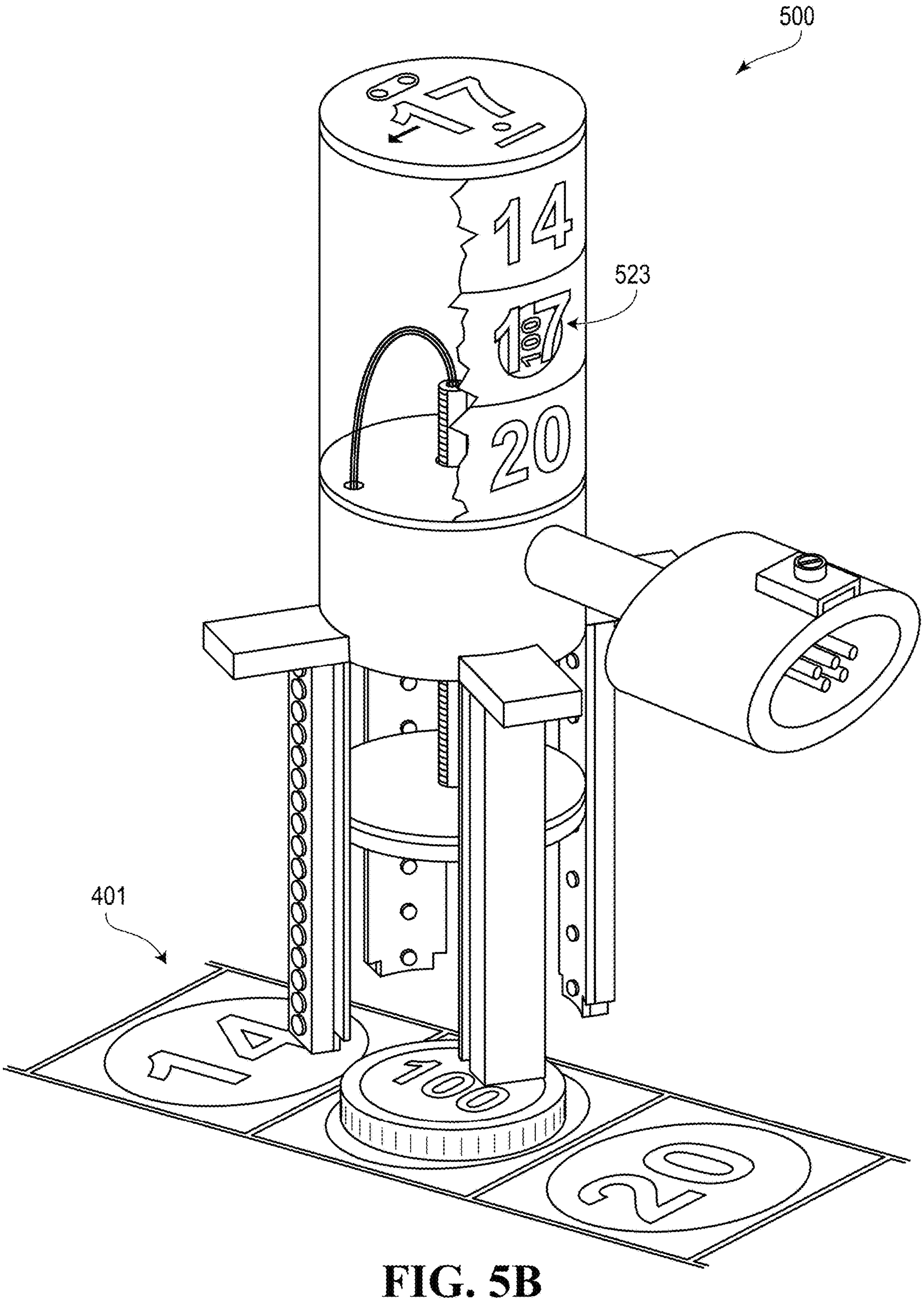
FIG. 5B is a perspective view of another example device for handling casino chips that may be used with an example proxy device.

Referring now to FIGS. 5A-5B, shown therein is an example of a chip dispenser 500. The chip dispenser 500 is an example of a chip handling component that can be used by a proxy device to manipulate casino chips 511.

As shown in FIG. 5A, the dispenser can include a chip receiving area or channel 521. The chip receiving area 521 can be shaped and sized to accommodate a plurality of casino chips while facilitating controlled dispensing of the chips.

In the example shown in FIG. 5A, the chip receiving area 521 is a cylindrical channel shaped to receive a plurality of chips 511 in a stack. The chip receiving area 521 can be sized to collect and dispense a number of chips, for example a stack of up to 20 chips, stack of up to 30 chips, a stack of up to 40 chips, a stack of up to 50 chips, a stack of up to 60 chips and so forth depending on the implementation.

For example, the height of a casino chip may be about 3 to 3.25 mm (e.g. 3.16 mm). Accordingly the internal length of the chip receiving area 521 can be sized between about 30 mm to about 350 mm (or larger) depending on the number of chips that the dispenser 500 is intended to hold.

The chip receiving area 521 can be defined by one or more outer sidewall sections or channel members 513. In the example illustrated, channel members 513 are provided by downwardly extending fingers. The fingers 513 are spaced around the perimeter of the chip receiving area 521. The fingers 513 are arranged to define the chip receiving area 521 with a width marginally larger than the width of the chips 511.

The interior of the fingers 513 can be arcuate or curved to facilitate gripping of circular chips. Alternatively, the fingers 513 can be shaped and arranged to accommodate different shapes and sizes of chips, such as square or rectangular chips for example.

More generally, dispenser 500 can be used (with appropriate modifications) with any type of chip, including chips with dealer assigned values, fixed casino issued value chips, electronic chips etc.

The fingers 513 can also include inwardly extending projections or protrusions 517. The projections on each finger 513 can be spaced apart by the height of a chip (or a distance slightly greater than the height of a chip). For example, a standard casino chip may have a height of about 3 to 3.25 mm (e.g. 3.16 mm). Accordingly, the projections can be spaced apart by a distance of about 3 mm, or a distance of about 3.1 mm or a distance of about 3.16 mm or a distance of about 3.2 mm or a distance of about 3.3 mm or a distance of about 3.4 mm or a distance of about 3.5 mm or a distance of about 3.6 mm or a distance of about 3.7 mm or a distance of about 3.8 mm or a distance of about 3.9 mm or a distance of about 4 mm.

The projections 517 can extend into the chip receiving area 521 to retain the chips 511 within the chip receiving area 521.

The projections 517 on the fingers 513 can be vertically aligned with one another. That is, each finger 513 can include a plurality of projections 517 that are vertically spaced apart. Each projection 517 associated with a given finger 513 can be vertically aligned with a corresponding projection on each other finger 513 to define an individual chip receiving space.

Collectively, the aligned projections 517 can define a reduced internal perimeter area that is slightly less than the diameter of the chips 511. Accordingly the chips can be retained within the channel receiving area 521 resting on the projections 517.

Optionally, fingers 513 can be movable inwardly and outwardly to adjust the diameter of the chip receiving area 521. This can allow the chip receiving area to be increased when collecting chips 511 from a gaming table. In the example shown in FIG. 5A, the fingers 513 can move inwardly and outwardly along track members 527. When the fingers 513 are in an inward most position, the fingers 513 can engage and secure the chips 511 within the channel 512. When the fingers 513 are moved apart to a release position, the diameter of the chip receiving area 521 can be increased to be greater than the diameter of chips 511 to allow the chips to be released and/or to allow the dispenser 500 to collect a stack of chips.

Optionally, the projections 517 may be fixed relative to the fingers 513. Accordingly, the projections 517 may define shelves on which the chips 511 can be supported within the channel 512. The chips can then be grasped and released by adjusting the positioning of the fingers 513.

Alternatively, the projections 517 may be movable relative to the fingers 513. The projections 517 can move inwardly and outwardly relative to the fingers 513 (or fingers 513 can move relative to the projections 517) to allow chips to be selectively released from, or retained in, the channel 512.

Optionally, the projections 517 may extend out from a recess provided in the fingers 513. The projections 517 may be movable between an extended position and a retracted position. In the extended position, the projections 517 can project outwardly from the surface of the fingers 513 into the channel 512. In the retracted position, the projections 517 can be recessed within the corresponding recess and may be flush with the surface of the fingers 513.

Optionally, the projections 517 may be biased to the extended position. The projections 517 may retract from the extended position to the retracted position in response to a force applied on the projections 517 (e.g. from a chip 511 being moved along the channel 512).

Alternatively or in addition, the projections 517 may be controllably retractable. That is, the device 500 may include a controller that is operable to electronically adjust the position of each projection 517 between the extended and retracted positions. This can allow the chips to be selectively released from, or retained in, the channel 512 in the absence of an ejection member.

For example, the channel 521 may hold five chips. In order to dispense only four chips, the projections 517 below the four chips can be retracted while the remaining projections 517 can remain in an extended position to retain the remaining chips within the channel 521. A similar approach can be used to collect additional chips when there are already chips in the channel 521.

Alternatively or in addition, the projections 517 may be flexible. This can allow the chips 511 to be pushed past the projections 517 in response to an applied vertical force while still retaining the chips 511 within the channel 521 when no force is applied. The flexible projections 517 may be rubberized. Optionally, flexible projections 517 can be fixed in position (i.e. not adjustable between an extended and retracted position).

Optionally, the dispenser 500 can also include an ejection member. The ejection member can be used to eject chips 511 from the chip receiving area 521.

In the example shown in FIG. 5A, an ejection member is provided in the form of a plunger 519. The plunger 519 extend downwardly through the channel 521 to eject chips 511 from the channel 521. This may help eject chips 511 that are trapped e.g. due to buildup of dirt and debris. Optionally, the ejection member may be coupled to a vibrational motor. This may further facilitate ejecting a desired number of chips 511 that are trapped or stuck together.

The plunger 519 can be configured to extend to a defined depth depending on the number of chips being dispensed. For example, the plunger 519 can be configured to extend to different chip levels corresponding to the number of chips 511 that are intended to remain within the chip receiving area 521.

Optionally, the dispenser 500 can include a vibrational chip receiving area 521. The chip receiving area 521 (e.g. fingers 513) or elements therein (e.g. using plunger 519) can be agitated or vibrated when dispensing chips to facilitate dispensing chips that may be trapped or stuck (e.g. due to dirt or debris). For example, the plunger 519 or fingers 513 can vibrate or oscillate within the channel receiving area 521 to dislodge chips that are stuck or trapped. This can ensure that the correct number of chips 511 is dispensed onto the table.

As shown in FIG. 5A, the dispenser 500 can also include a connector 525. The connector 525 can provide electrical and electronic couplings between the dispenser 500 and a proxy device. The connectors 525 allow the proxy device to provide control signals to control the operation of the dispenser 500 (e.g. fingers 513, projections 517, plunger 519 etc.). The connectors 525 also allow the dispenser to provide feedback data to the proxy device relating to the operational status of the dispenser.

The dispenser 500 and/or proxy device can also include various position and environmental sensors operable to monitor the position of the dispenser 500 relative to the environment of the gaming location.

For example, the dispenser 500 may include proximity and/or collision detection sensors. The proximity sensors may be used to prevent the dispenser from colliding with the table, other individuals at the table, and/or chips positioned on or at the table location.

The dispenser 500 can also include force sensors operable to detect forces applied to the dispenser 500. This may help ensure that the dispenser 500 does not cause damage to itself, employee personnel, live participants, and/or other objects at the gaming location. For example, the proxy device 110 can be configured to reduce the pressure applied to dispenser 500 in response to determining that an applied force is greater than a predefined safety threshold.

Optionally, the dispenser 500 can include chip identification sensors operable to identify the chip colors and/or values of the chips 511 collected within the channel 521. For example, the dispenser 500 may include optical sensors and/or cameras operable to detect the color (and thereby the value) of the chips 511 being collected and deposited.

Optionally, the dispenser 500 can include one or more output devices. The output devices can provide an indication or display related to the status and/or operation of the dispenser 500. For example, dispenser 500 can include a display 523. The display 523 can be coupled to a camera arranged to capture images of the current position of the channel 521. This may help the user ensure that the chips 511 are being correctly positioned on a gaming table such as roulette table 401. This can also indicate to other individuals at the gaming location (e.g. dealer, other players) the wagers being placed by the dispenser 500.

In the example shown in FIG. 5B, the dispenser 500 has a cylindrical channel 521. Accordingly, the display 523 can be provided as a curved or flexible display that at least partially surrounds a portion of the channel 521.

Alternatively or in addition, a digital layout of the gaming table can be defined for the proxy device. The digital layout can be mapped to the real-world location of the gaming table. The position of the dispenser can then be monitored using one or more position sensors onboard the dispenser and/or proxy device. The dispenser location can then be reflected within the digital layout based on the current coordinates and the mapping between the gaming table and the digital layout.

FIG. 4C illustrates an example of a proxy device 110 using dispenser 500 to participate in a game at roulette 401. As can be seen in FIG. 4C, the proxy device 110 can manipulate a dispenser 500 to dispense chips onto roulette table 401 in order to wager on specific numbers. Although FIG. 4C shows the dispenser being grasped by an extension member mounted to the proxy member 110, it should also be understood that dispenser 500 can be mounted directly to the proxy member 110 (e.g. fixed to or removably mounted to an extension member).

The dispenser 500 may also provide a simplified method of viewing the chips 511 that are dispensed by the proxy device 110. As noted above, the dispenser 500 can include an output display 523 that displays an image or video of the chips 511 being dispenser by the proxy device 110. This image data can be transmitted directly to a remote user device and/or captured by an image capture device provided on the proxy device 110 to provide the remote user with a clear indication of the wager being placed.

As shown in FIG. 4A, a proxy device 110 may include alternative chip handling members, such as a gripping member 230*b*. The gripping member 230*b* can be configured to grasp and release chips 511 in order to place wagers on the table 401.

As shown in FIG. 4A, the gripping member 230*b* can be moved to a desired location (e.g. above number 19) in order to place a wager on the remote user's desired number.

Game Specific Adaptations

As noted above, the proxy device can be used to participate in a variety of live in-person games. To facilitate participation in particular games or types of games, the proxy device can include an output device in the form of a game-specific interaction unit. The game specific interaction unit can be configured to enable the proxy device to participate in a specified game (e.g. roulette, poker, or blackjack) or type of game (e.g. card games, table games, slots).

Optionally, the proxy device can include a plurality of game-specific interaction units. Each game-specific interaction unit may be specifically configured to enable participation in a corresponding game or type of game. This can allow the same proxy device to participate in different games or different game types within a gaming venue and/or at different gaming venues.

The proxy device may be configured to adjust between the game-specific interaction units to enable the device to participate in different games. For example, the game-specific interaction units may be mounted to different extension members that are extendible and retractable. The proxy device may extend a particular extension member on which the desired game-specific interaction unit is mounted in order to participate in a corresponding game. Optionally, the proxy device can then retract the extension member(s) containing other game-specific interaction units not currently in use.

Optionally, one or more of the game-specific interaction units may be removable from the proxy device. This can allow the proxy device to participate in a variety of different games and/or game types without requiring the proxy device to store multiple different game-specific interaction units. For example, the game-specific interaction units may be stored at a given gaming location and mounted to a proxy device (e.g. by a dealer or other individual at the gaming location) when that proxy device is positioned at that gaming location.

Optionally, a game-specific interaction unit may include a coupling connector similar to connector 525 shown in FIG. 5A. The coupling connector can be used to couple the game-specific interaction unit to a proxy device to enable the proxy device to use the game-specific interaction unit during a gaming session.

Alternatively or in addition, the game-specific interaction unit may include a wireless communication module usable to communicate wirelessly with a proxy device. The proxy device may control the game-specific interaction unit wirelessly during a gaming session.

Optionally, a game-specific interaction unit can include an onboard power source such as one or more batteries or other energy storage members. Alternatively or in addition, the game-specific interaction unit can include a power connector usable to couple the game-specific interaction unit to a source of power, such as mains power or a portable power source. The power connector may be combined with a coupling connector and/or a separate coupling component.

The robotic proxy device can include one or more gaming-specific adaptations that allow the robotic proxy to participate in specific casino games. The proxy device may include multiple adaptations that allow the robotic proxy to easily transition between casino games. Alternately, the robotic proxy's wagering adaptations may be removable and stored at a gaming table or a secure room location where they can be attached/detached by the dealers or other casino employees.

CARD GAME ADAPTATION

The following is a description of a card game adaptation device that may be used by itself in any proxy gaming system or in any combination or sub-combination with any other feature or features disclosed herein.

In accordance with this aspect, a card game adaptation device is provided that can allow a proxy device to receive and identify playing cards associated with a card game in a secure manner. The card game adaptation device can identify the playing cards dealt to the proxy device while preventing other in-person players from identifying the playing cards. This may be particularly beneficial for card games such as poker in which maintaining the secrecy of one's cards is a crucial aspect of gameplay.

Figure 8A:
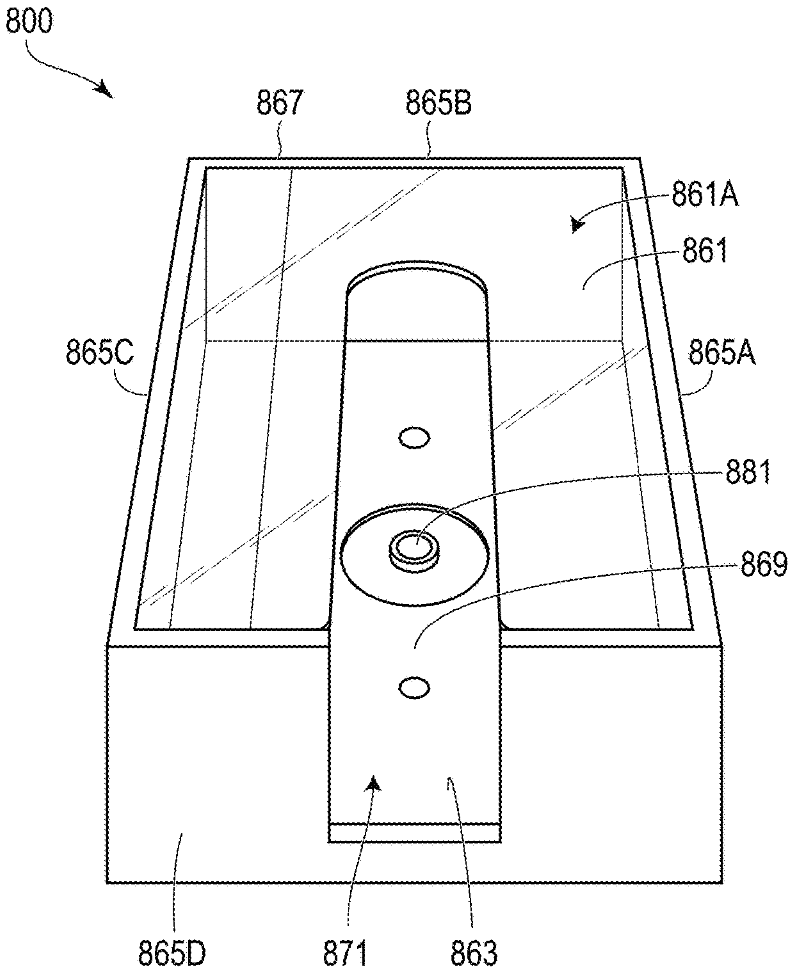
FIG. 8A is a top perspective view of an example device for facilitating participation in a card game that may be used with an example proxy device.
Figure 8B:
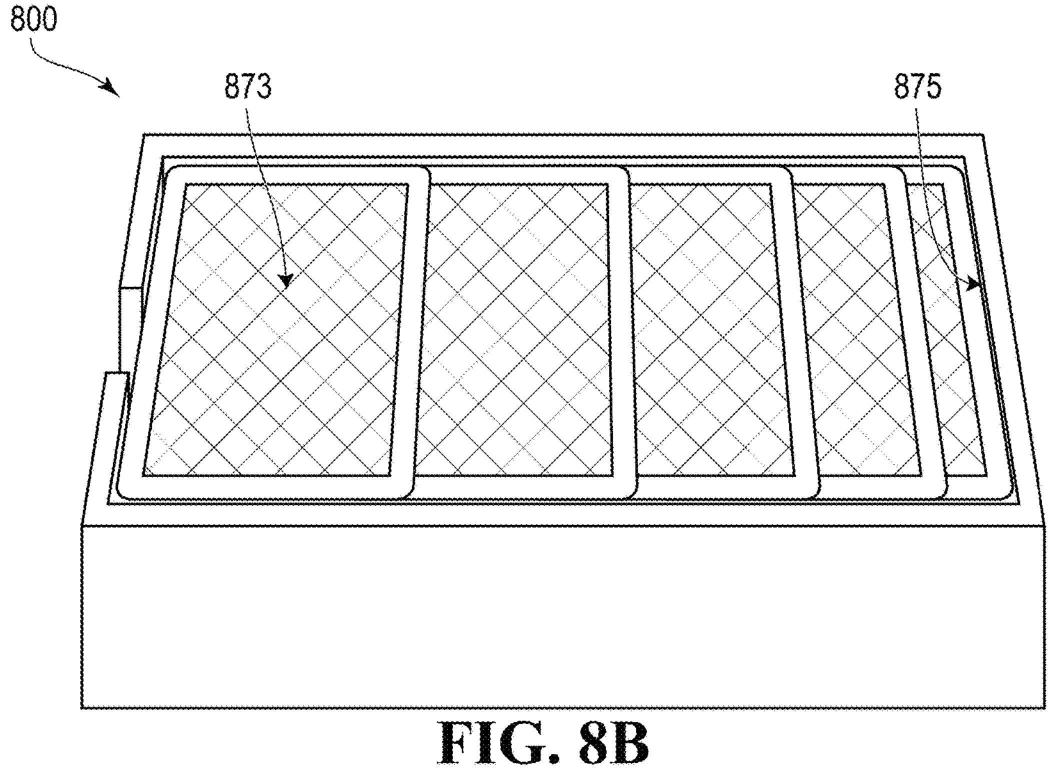
FIG. 8B is a top perspective view of the device of FIG. 8A with playing cards positioned on an upper surface of the device.
Figure 8C:
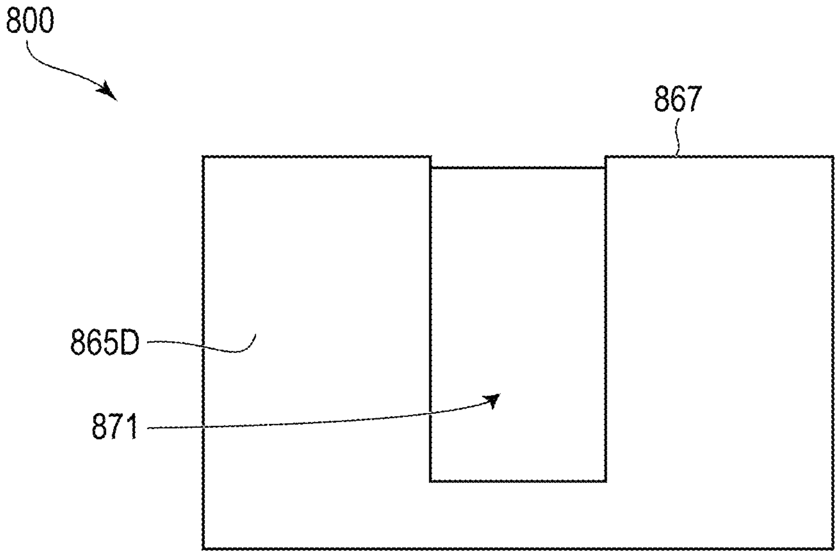
FIG. 8C is a side view of the device of FIG. 8A.

Referring now to FIGS. 8A-8C, shown therein is an example of a card game adaptation device 800. As should be apparent, the device 800 shown in FIGS. 8A-8C is an example prototype of a card game adaptation device.

The device 800 includes a card receiving surface 861A onto which playing cards 873 can be dealt (e.g. by a dealer at a gaming location). The cards 873 can be positioned on the card receiving surface 861A with the front face of the cards obscured from other players in the vicinity of the device 800. The device 800 can include a camera 881 positioned to capture an image of the face of playing cards 873 so that a remote user can determine the specific cards 873 that have been dealt to their proxy device.

As shown in the example of FIGS. 8A-8C, the device 800 can be provided with an enclosure containing the camera. The enclosure can include a spacing between the camera 881 and the card receiving surface 861A to ensure that the field of view of camera 881 is sufficient to capture all of the cards 873 positioned on surface 861A.

As shown, device 800 includes a bottom wall 869. At least one sidewall 865 can extend between the bottom wall 869 and the top end 867 of the device. The bottom wall 869 and each side wall 865 can be substantially opaque. This can prevent other players from identifying the cards 873 dealt to the proxy device.

In the example illustrated, device 800 is substantially rectangular. Accordingly, device 800 includes four sidewalls 865A-865D extending between the bottom wall 869 and top end 867. Alternatively, the device 800 can be provided in different shapes which may result in a greater or fewer number of sidewalls.

Alternatively or in addition, one or more sides of the device 800 may omit a sidewall. This may facilitate dealing the playing cards 873 onto the surface 861A and/or removing the playing cards 873 therefrom.

The device 800 can also include an upper wall member 861 proximate the top end 867. The upper wall member 861 can define an inner side 861B facing the interior of device 800 and an outer side 861A opposite to the inner side 861B. The outer side 861A may also be referred to as the card receiving surface. The upper wall member 861 can define the card receiving surface 861A onto which the cards 873 can be dealt.

The device 800 can also include a camera 881. The camera 881 can be arranged to face the inner side 861B of the upper wall member 861. The camera 881 can be configured to capture images of objects (e.g. playing cards 873) positioned on the outer side 861A of the upper wall 861.

As shown in the example of FIGS. 8A-8C, the camera can be provided at the bottom wall 863 of device 800. For example, the camera 881 can be integrated into the bottom wall 863 facing upwards towards the wall 861. The inner side 861B of the upper wall member 861 can face the bottom wall 863 of the device 800. The wall 861 can be configured to allow the camera 881 to obtain images of the playing cards 873 positioned on the card receiving surface 861A.

For example, the upper wall member 861 can be transparent or at least sufficiently transparent or translucent to enable the face of the playing cards to be readily identifiable. Alternatively or in addition, the upper wall member 861 may include openings to allow the camera 881 to image the face of playing cards 873 positioned on the card receiving surface 861A.

In device 800, the upper wall 861 can be positioned below the device top end 867. That is, the sidewalls 865 may extend upwardly between the upper wall 861 such that the upper wall member 861 is recessed below the device top end 867. This may help ensure that the cards 873 are not visible to in-person players at the gaming location. As shown in FIG. 8B, an upper section 875 of the sidewalls 865 can extend above the upper wall member 861.

The device 800 can also include one or more cut-out sections. The cut-out sections may facilitate positioning the cards 873 on the receiving surface 861A and/or removing the playing cards 873 therefrom. For example, the upper wall member 861 can include a cut-out or void section 869. The void section 869 can be positioned to facilitate the removal of objects (e.g. playing cards 873) positioned on the outer side 861A.

The void section 869 can be sized to permit a finger (e.g. the dealer's finger) to pass therethrough. For example, the void section 869 can define a card removal channel located at one end of the upper surface 861. This can allow a dealer to easily retrieve the cards 873 by inserting a finger into the void section 869 and collecting the cards 873 in a single sweeping motion.

The device 800 can also include a cut-out section 871 in a portion of the sidewall (e.g. sidewall 865D as in FIG. 8A). The cut-out section 871 can be aligned with void section 869 to further facilitate removal of objects on the upper surface 861A.

Optionally, the device 800 can include a closure member for the cut-out section 871. For example, the sidewall 865D can include a movable wall section that is movable to open and close the cut-out section. Closing the wall section while the game is in progress can further ensure that in-person players cannot see the playing cards 873.

Optionally, the device 800 can also include a card insertion slot (not shown). The slot can be provided by one or more of the sidewalls 865. The slot can be shaped to receive a playing card inserted therein. The slot can be positioned so that the playing cards 873 inserted through the slot are positioned on the card receiving surface 861A. For example, the slot can be located on a sidewall 865 between the upper wall member 861 and the device top end 867. A dealer can insert the card 873 into the card insertion slot to allow the camera 881 to image the card while preventing nearby players from identifying the card.

The device 800 can be sized to accommodate varying numbers, shapes and sizes of playing cards. For example, the upper wall member 861 may be shaped to receive at least two adjacent playing cards (e.g. for use in games such as Texas Hold 'Em poker). As in the example shown, the upper wall member 861 can be shaped to receive at least five adjacent playing cards.

An electronics module can be coupled to the camera 881. The electronics module can control operation of the camera 881 and transmit the image data from the camera 881 to a remote user (e.g. via the proxy device). The electronics module can include a processor and a communication interface. The processor can obtain images from the camera and transmit the images to a user device via the communication interface. The processor can also control the operation of the camera 881 to capture images of cards 873.

Optionally, the electronics module may be contained within the device 800 itself. Alternatively, the electronics module may be external to device 800 (e.g. as part of the body of the proxy device).

The device 800 can also include various additional components, such as status indicators relating to the game. The bottom wall 863 (or a portion thereof) may be removable to allow the components of the device 800, such as camera 881 to be easily maintained, repaired and/or replaced.

Optionally device 800 may be movable. For example, the device 800 can be mounted to a movable base. Alternatively or in addition, the device 800 may require manual intervention to move the device 800. This can allow the device 800 to be positioned at different gaming locations.

Alternatively, the device 800 may be associated with a specific gaming location. A proxy device 800 can establish a connection with the device 800 to use the device 800 when participating in a game at the specific gaming location.

Optionally, the device 800 may be fixed to a particular gaming location (i.e. not easily removable from the particular gaming location).

Optionally, device 800 may include device identification data. The device identification data can specify a particular venue and/or gaming location associated with that device 800.

The device 800 can be coupled to a movable arm. For example, the device 800 can be mounted to the end of a movable arm of a proxy device as shown in the example of FIGS. 6A and 6B.

Although not shown in FIGS. 8A-8C, device 800 can include a coupling connector similar to connector 525 shown in FIG. 5A. The coupling connector may be used to couple device 800 to a proxy device. Alternatively or in addition, the device 800 may include a wireless communication module usable to communicate wirelessly with a proxy device.

Optionally, device 800 can include an onboard power source such as one or more batteries or other energy storage members. Alternatively or in addition, the device 800 can include a power connector usable to couple the device 800 to a source of power, such as mains power or a portable power source. The power connector may be combined with a coupling connector and/or a separate coupling component.

SLOT MACHINE ADAPTATION

The following is a description of a slot machine adaptation that may be used by itself in any proxy gaming system or in any combination or sub-combination with any other feature or features disclosed herein.

In accordance with this aspect, a slot machine adaptation is provided that can facilitate the use of a slot machine by a proxy device. The slot machine adaptation can allow the proxy device to interface and interact with slot and video machines on behalf of a user. The slot machine adaptation can be defined to minimize or prevent interference by other individuals present at a gaming location.

FIG. 7 illustrates an example 700 of a proxy device 110 that includes various adaptations to facilitate slot machine gaming. As will be appreciated, a proxy device 110 can be configured to operate with more, fewer, or different adaptations.

In a first example, the slot machine adaptation can include an electronic slot machine interface such as interface 755. The interface 755 may provide a coupling connection in a manner similar to connector 525.

The interface 755 can include an electronic connector provided on an extension member mounted to the proxy device. The electronic connector can engage a corresponding connector on the slot machine to enable the proxy device to input wagers and commands to the slot machine. Optionally, the slot machine can be configured to disable manual better controls in response to engagement with the electronic connector of the proxy device. This can ensure that a remote player can play the slot machine while ensuring that participants at the gaming location cannot interfere with the slot machine or wagers by the proxy device.

Alternatively or in addition, the proxy device can be configured to operate a slot machine without requiring the interface 755 to physically engage the slot machine. For example, the proxy device may communicate with the slot machine wirelessly to enable a remote user to participate in a slot game. Optionally, the proxy device may even omit the interface 755.

Optionally, the slot machine adaptation can include a cash replacement extension. The cash replacement extension may be insertable into an electronic bill validator provided by the slot-machine to enable the robotic proxy to insert value into the slot-machine without requiring actual cash to be inserted. This can allow a remote user to obtain credits at the slot machine without requiring cash or coins to be inserted manually.

Optionally, the slot machine adaptation can include a card replacement extension. The card replacement extension may be insertable by the proxy device into a card receiver at a game location such as a slot machine. The card replacement extension may be used to mimic or replace a card that a user may insert at a game location, such as a player points card for example. The replacement card extension may be inserted into an electronic points card validator provided by the slot machine to enable a remote player to accumulate electronic player points from the slot machine. These electronically earned remote points can be automatically linked to a players physical casino card to enable the user to accumulate player points while playing remotely or in-person. The player can then use their accumulated points in-person when they are that particular casino for dining benefits or other reward programs.

Optionally, the slot machine adaptation can include extension members operable to engage with manual input devices provided by a slot machine such as buttons, touch screens and/or levers. For example, a gripping member 747 can be positioned on an extension member to allow a proxy device to select the desired buttons (physical or digital) and/or pull the lever on the slot machine.

Optionally, the gripping member may include appropriate touch sensitive elements 757 to ensure that commands can be provided to a touch screen device. For example, a capacitive member can be provided on the extension member to provide the touch sensitive element 757 that is detectable by a touch screen. The specific nature of the touch sensitive element 757 may vary depending on the type of touch screen used by the slot machine.

Optionally, the proxy device 110 may include interference prevention elements operable to prevent live players from interfering with the slot machine. For example, a cover can be used to prevent live players from accessing the command elements (e.g. buttons, touchscreen etc.) of the slot device. The cover can be provided in various forms, including a removable transparent plastic cover that allows the proxy device to prevent tampering with the commands while ensuring a remote player can still view the command buttons that are accessible to the proxy device.

Optionally, the proxy device 110 can also include value input/output elements. This can enable a live player to input value to the proxy device 110 and/or retrieve value from the proxy device 110 after participating in a game.

For example, the proxy device 110 can include a value insertion unit, such as a credit/debit card reader and/or a cash insertion slot. A user can input value to the proxy device 110 through the value insertion unit to enable the proxy device 110 to participate in a game on behalf of the user.

As another example, the proxy device 110 can include a value output unit, such as a credit/debit card reader and/or a cash dispenser unit 745. A user can retrieve value from the proxy device 110 through the value output unit to retrieve the value obtained by the proxy device 110 while participating in a game on behalf of the user.

Optionally, proxy device 110 can also include additional output units. For example, proxy device 110 may have an output unit in the form of a printer. The printer may be incorporated into the proxy device and/or attachable thereto. The proxy device can operate the printer to print verification data onto a physical ticket (e.g. a cash out voucher ticket) that includes user identifier data associated with the remote player to ensure that the ticket can be identified as representing a payout intended for the remote player. This may enable the proxy device to perform a cash out action on a game such as a slot machine that results in the generation of a payout voucher. The printer can be used by the proxy device to add the user identifier data of the remote player to the physical ticket to ensure that funds can be correctly transferred to the remote player. This may simplify use of the proxy device with existing casino hardware.

Optionally, the device 110 can include a ticket storage device 749. The storage device 749 may be integrated into, or detachable from, the proxy device. The ticket storage device 749 can be used to store payout voucher tickets for later transfer to the cashier cage. The voucher tickets (optionally with added user identifier data) may then be removed and used at the cashier cage for reconciliation (e.g. to reconcile the payouts from the casino games with funds transferred to remote player). The storage device 749 may include controllable ticket handling components, such as pinch rollers for example, to allow the tickets to be easily inserted into the storage device 749 and retrieve/removed therefrom.

Optionally, proxy device 110 can include additional input units such as optical recognition scanners usable to read barcodes for example. This may allow a proxy device to identify data from various devices and physical elements of a casino game such as a payout ticket. The proxy device 110 may scan the data presented on a payout ticket (or game display or other game-related surface) and then perform a corresponding funds transfers to a remote user based on vouchers (or other payout indicia) received for the user in a casino.

Optionally, the proxy device may include a value storage unit such as a secured container 751. The value storage unit can store value provided in a physical form (e.g. cash, chips etc.) that represents value obtained by the remote player of the proxy device. The physical value stored in the container 751 can be used by a casino or other administrator to reconcile payments to the remote users. Optionally, the proxy device may output receipt data (e.g. using a printer) in response to value being stored in container 751. The receipt data may identify the remote user associated with the value being stored. The receipt data may ensure that the funds can be correctly allocated to the remote player.

Although the example of FIG. 7 shows separate storage devices 749 and 751, it should be understood that a proxy device may operate a combined storage device for both cash/chips and payout tickets.

ELECTRONIC CHIP SYSTEM

The following is a description of an electronic chip system that may be used by itself in any proxy gaming system or in any combination or sub-combination with any other feature or features disclosed herein.

In accordance with this aspect, an electronic chip system is provided that can be used to participate in casino games. The electronic chip system can be used by a proxy device (see e.g. FIG. 11) and/or live participant (see e.g. FIG. 10) to participate in the casino game. A dealer or other venue employee can also interact with the electronic chip system to accept or reject wagers and/or to output the results of a player's wager.

In general, an electronic chip system involves the use of one or more electronic casino chips having a variable value that can be assigned by the user when the user is placing a wager. The value of the electronic casino chip can also be assigned by a dealer when paying a winning wager to a player. The electronic chip can include one or more output display elements (e.g. display 1081) usable to convey information identifying the assigned value of the chip for a given wager. This can help reduce the number of chips required when a player is participating in a casino game. For example, a dealer can interact with the individual electronic chip to payout a winning wager rather than having to pass multiple casino chips to the player. This may also facilitate the participation of a proxy device, by minimizing the number of chips that the proxy device is required to manage while participating in a game on behalf of a remote user.

The electronic chip can be provided in the form of a device body that enables a user to place wagers in a casino game. The device body can include the components of the electronic chip, such as a controller and memory for example.

Optionally, the electronic chip can be used in combination with standard casino chips (e.g. table color assigned value chips 1011B and/or casino value chips 1011A). Alternatively, the electronic chip may allow for standard casino chips to be omitted. This may reduce the number of chips that a casino is required to manage. This may also enable a greater number of players to participate in a given game, e.g. by reducing the number of chips on a table for each participant or that are required to pay out winning wagers.

Optionally, the electronic chip can be sized to correspond to the shape and size of standard casino chips and/or the size of a dealer's tray. This may simplify use of the electronic chip with existing casino infrastructure. That is, the body of the electronic chip may be substantially cylindrical in shape. The device body can be shaped and sized to correspond to a standard casino chip. For example, the body of the electronic chip may have a diameter in a range of about 35-50 mm, and in particular the electronic chip may have a diameter of about 39 mm (e.g. for use in a poker game). The thickness of the electronic chip may vary depending on the implementation.

Optionally, the electronic chip can be shaped or sized (e.g. longer and/or wider) to differentiate the electronic chip from a standard casino chip. For example, the electronic chip may be an elongated electronic chip (e.g. having a longer vertical length as compared to a standard chip). This may allow the electronic chip to be easily identified as an electronic chip as opposed to a standard casino chip. This may also facilitate manipulation of the electronic chip by the user.

Optionally, a participant in a casino game or casino venue making use of the electronic chip system can have an associated electronically monitored account. The user account can identify the value associated with that user that can be assigned to a corresponding electronic chip. For example, the proxy gaming platform can maintain a user value account for each user when the user is participating in games at one or more game venues. A user may establish a link between the electronic chip and the user account using authentication data associated with that user account.

Optionally, when a user places a wager, the corresponding value can be removed from the user's account (e.g. placed in an escrow type account) or otherwise held in the user's account.

Alternatively or in addition, the electronic chip itself can include memory storing the available value of that chip (e.g. an available wager amount). A user may input value to the chip (e.g. via a user device, proxy device or cashier at a game venue). The electronic chip can then adjust the accessible value based on the results of wagers involving that chip. The controller can update the available wager amount based on the outcome of wagers placed using that chip.

The accessible value stored by the electronic chip can limit the value of wagers placed using that chip. That is, the controller of the electronic chip may be configured to adjust the wager value to a maximum wager amount that is defined based on the available wager amount.

Alternatively or in addition, an electronic chip can store value that is redeemable at the casino. For example, a user may input value to the electronic chip at the casino in generally the same manner as purchasing standard casino chips (e.g. through a buy-in at a game table location such as a roulette or blackjack table, a transaction at a cashier's cage etc.). Alternatively or in addition, value can be added to the chip electronically, e.g. through an electronic transaction with a user device and/or through a chip loading station where a user can perform a transaction.

Optionally, the electronic chip may include a wireless communication module. The wireless communication module can enable the electronic chip to send and receive data between the electronic chip and devices such as a proxy device, user device, dealer device, server etc. The electronic chip may send and receive various types of data such as wager data, wager result data, user account data, available value data etc.

The electronic chip can be configured to receive inputs indicating the wagered amount and to modify the output display to reflect that wagered amount. The wager on an electronic chip can be adjusted in response to commands from a live player, a proxy device, and/or venue personnel. For example, a dealer may manually adjust the value of the electronic chip in response to commands from a live player and/or proxy device.

Optionally, the electronic chip can include user inputs enabling a user (or proxy device or the dealer) to adjust the values of wagers being placed. The electronic chip can include a user input interface coupled to the controller. The user input can receive user wager inputs usable by the controller to define the value of a wager associated with that chip at that point in game play.

Figure 10:
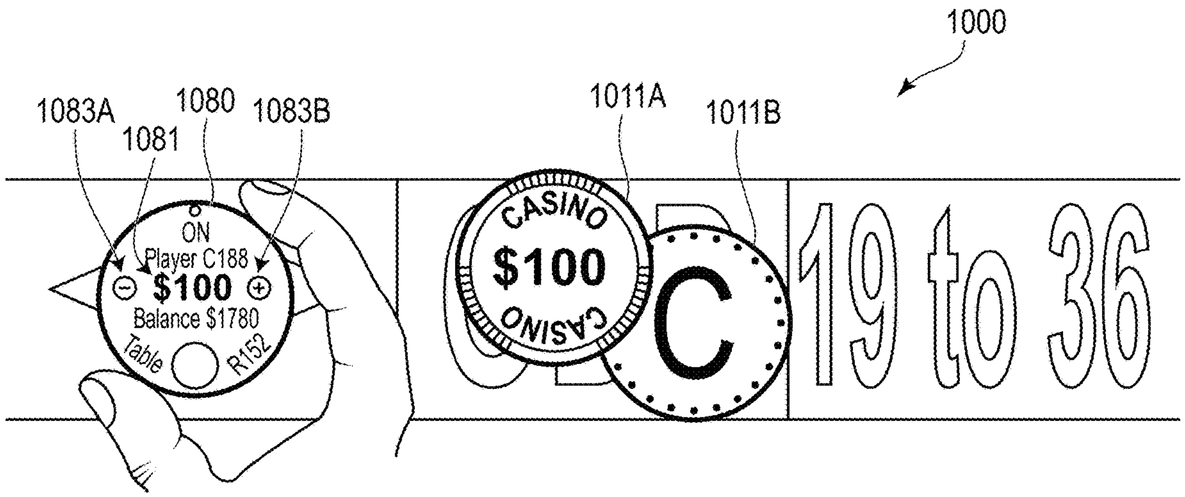
FIG. 10 is a partial top view of an example game table with a player participating in a casino game using an example electronic chip.
Figure 11:
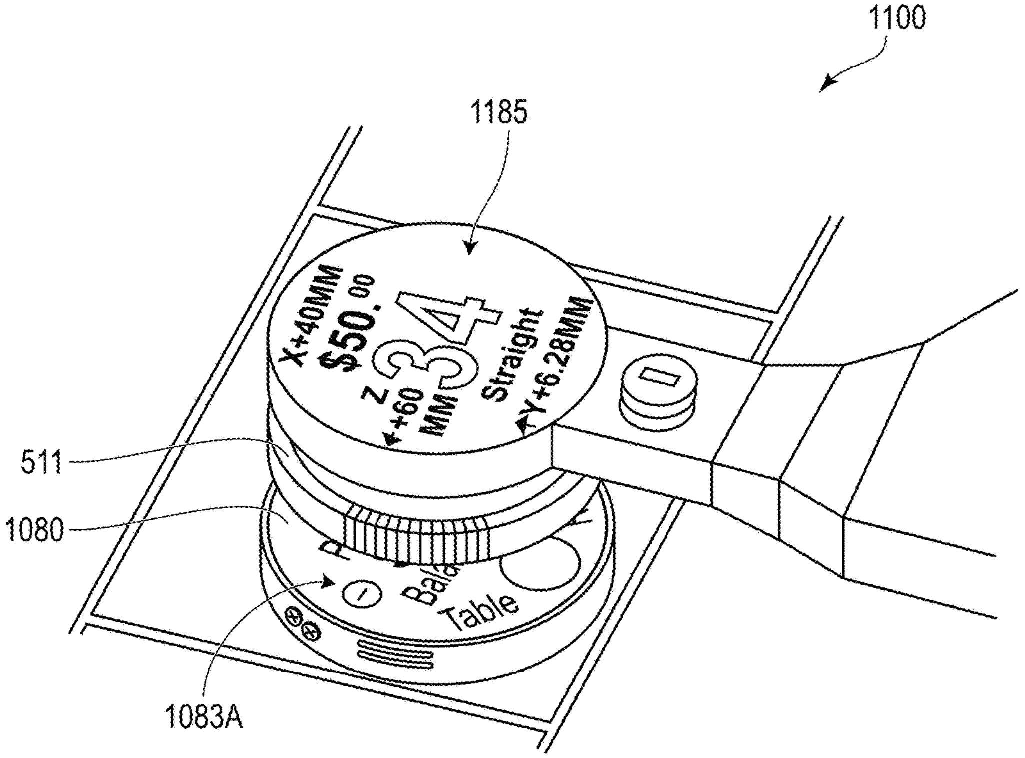
FIG. 11 is a partial perspective view of an example game table with a proxy device participating in a casino game using an example electronic chip.

In the example shown in FIGS. 10 and 11, the wager placed on chip 1080 can be adjusted using input buttons 1083A and 1083B. The data shown on display 1081 can then change in response to the inputs received through inputs 1083A and 1083B. In the example illustrated, the input buttons 1083 are positioned on the top surface of the electronic chip. Alternatively, the input buttons 1083 may be positioned along the side of the electronic chip.

As illustrated, the electronic chip 1080 can include an increase wager button 1083B and a decrease wager button 1083A. The controller can adjust the wager value by a predefined amount in response to a wager input received at either one of the buttons 1083. The predefined amount may be predefined for the electronic chip. Alternatively, a user may define the predefined amount when initiating a gaming session using the electronic chip 1080 (e.g. during the initiation process, as a predefined amount stored in their user account data, etc.).

Optionally, the electronic chip 1080 can have more, fewer and/or different input and/or output devices. For example, an electronic chip 1080 may include one or more speakers. The speakers can be used to output game and wager related data, such as a wager being place, remaining account balance, chip status (e.g. charging status) etc. Alternatively or in addition, the electronic chip can include an output display such as display 1081 shown in the example of FIG. 10.

The electronic chip 1080 can include one or more onboard energy storage members. Accordingly, the chip 1080 may include a recharging unit, e.g. a wireless or wired charging unit.

The electronic chip 1080 can also include various additional input devices, such as on/off switches or buttons for example.

A proxy device 120 can be configured with an electronic chip handler adaptation 1185 to facilitate use of the electronic chip 1080. The electronic chip handler 1185 can include couplings (e.g. signal connectors) to allow the proxy device 120 to adjust the wagers on the chip 1080. The electronic chip handler can 1185 can also include chip gripping elements to allow the proxy device to position and reposition the electronic chip 1080 in order to place a wager.

Optionally, the electronic chip handler 1185 can be integrated into, or otherwise combined with, a chip dispenser such as the example chip dispenser 500.

Optionally, a proxy device 120 may include a non-removable electronic chip 1080. For example, an electronic chip 1080 can be fixed to or integrated into the extension member (e.g. fixed to the electronic chip handler 1185). The proxy device 120 may place a wager by positioning the electronic chip 1080 over a betting location (e.g. a number on a roulette table), displaying the bet and/or placing the wager electronically with the gaming system.

Alternatively or in addition, the value of the electronic chip may be adjusted automated in response to electronic commands from a proxy device, e.g. using wireless signals to adjust the value of the electronic chip and/or through a physical connector provided by an extension member (e.g. as shown in FIG. 11). The chip can be configured to automatically adjust the output displayed to reflect the value of the chip (e.g. changing a color and/or a numerical value displayed by the chip).

When a wager is complete, a venue employee (e.g. a dealer) can update the status of the electronic chip (and associated user account) to reflect whether the user won or lost or tied the wager. The electronic chip and user's account can be updated accordingly.

Figure 12:
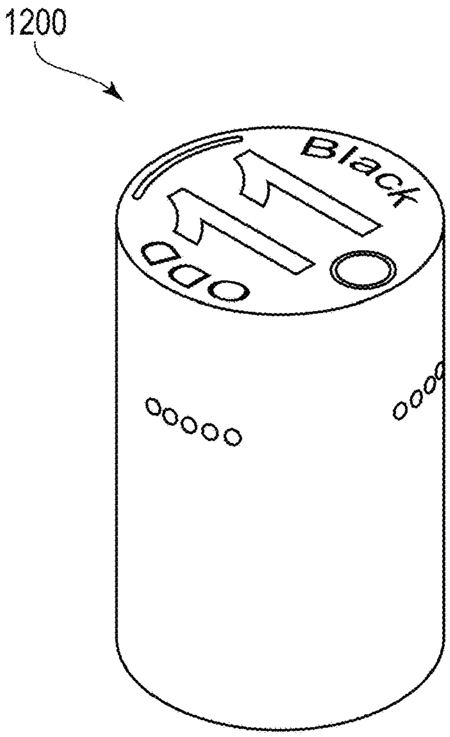
FIG. 12 is a perspective view of an example electronic chip control unit.
Figure 13:
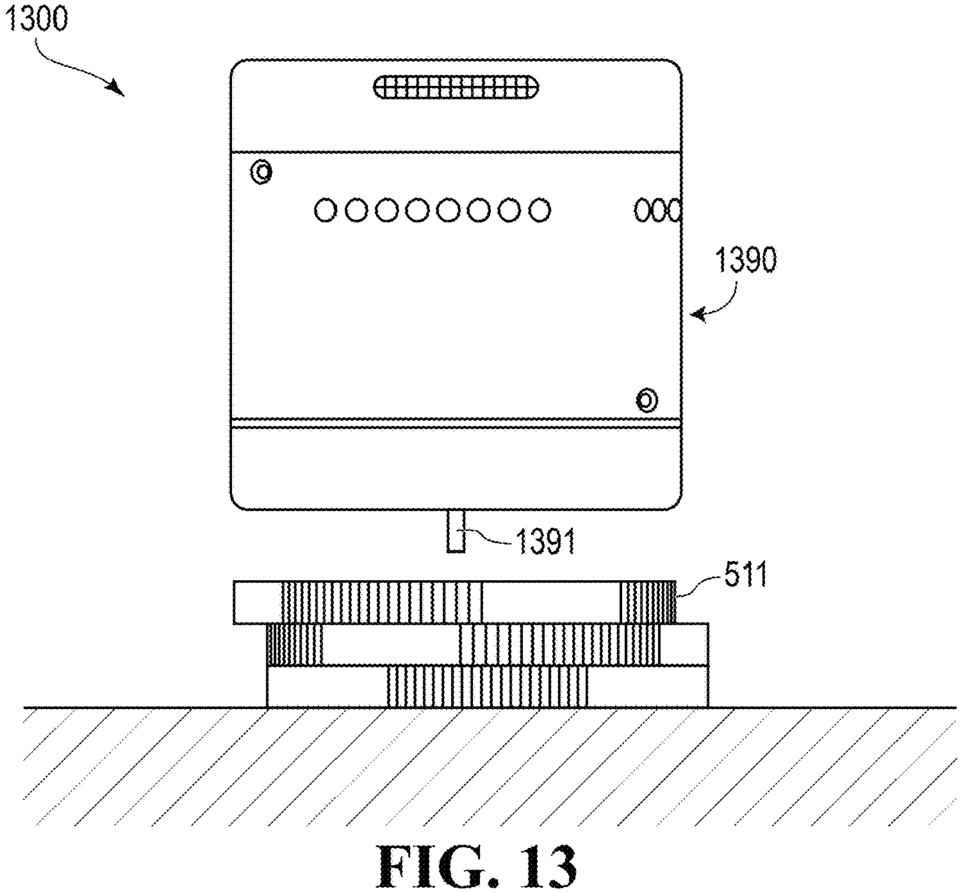
FIG. 13 is a side view of an example electronic chip and another example chip control unit.

For example, a dealer may operate a chip control unit such as the example chip control unit 1200 shown in FIG. 12. The chip control unit can be configured to interface with an electronic chip, such as chip 1080 or a wagering device such as device 1390 or 900. When a wager is complete, the dealer can use the chip control unit 1200 to provide feedback to the electronic chip 1080 indicating the result of the wager. The value associated with the electronic chip can then be updated automatically in response to the feedback from the chip control unit 1200.

Optionally, the chip control unit 1200 can be used by the dealer to indicate to an electronic chip whether a given wager was won or lost. For example, the dealer can select a payout mode (e.g. through a button on chip control unit 1200). In the payout mode, the chip control unit 1200 can provide feedback to the electronic chip indicating that the wager was won and initiating a transfer of value to the chip and/or account associated with the chip. The dealer can also select a wager lost mode (e.g. through a button on chip control unit 1200). In the wager lost mode, the chip control unit 1200 can provide feedback to the electronic chip indicating that the wager was lost and initiating a transfer of value from the chip and/or account associated with the chip.

As shown in FIG. 12, the chip control unit 1200 can indicate to the dealer game status data (e.g. the winning roulette wagers). This can assist the dealer in selecting the correct mode for each electronic chip that has been placed on a given game table. For example, the chip control unit 1200 can show the dealer and players the outcome of a given round (e.g. the wining roulette number 11 is shown on unit 1200 in FIG. 12). The chip control unit 1200 may also provide the dealer with a payout indication indicating that one or more wagers were successful and need to be paid out.

Optionally, the dealer may manually adjust the chip control unit to indicate whether the wager was won or lost. Alternatively, the chip control unit may be updated automatically in response to monitoring of the game play (e.g. by detecting the result of a roulette spin and the wagers placed on that spin (see e.g. chip control unit 1200).

Optionally, the chip control unit and electronic chip 1080 or wagering device 1390 can have detachable mating coupling members. This may allow the chip control unit to engage with the chip 1080 easily and rapidly to provide wager result feedback relating to the result of a wager. For example, the chip control unit may include a projection (e.g. similar to chip projection 1391) that can be used to initiate a payout to an electronic chip. Optionally, the electronic chip can include a corresponding recess shaped to the receive the projection to initiate the payout transaction.

Optionally, the electronic chip can be configured to temporarily display a wager result indicating the value won or lost by the user in a preceding wager.

Optionally, the electronic chip can be configured to display an account status indicator reflecting the current amount of value held by the user. For example, the electronic chip can display the user's current account value between wagers placed by the user. This may provide an indication of the value held by the user that replaces a stack of chips that would otherwise be used by the participant in a casino game.

Optionally, a player may use a wagering device 1390 to place wagers electronically on a game table. The wagering device 1390 can include a wager positioning member that can be used to select the particular location for the wager (e.g. for table games having specified wagering locations such as roulette). A user can manipulate the wagering device 1390 to place a wager in the live game. The wager can be submitted electronically and may be represented on a virtual display visible to players in the proximity of the game location.

Use of the electronic chip may vary depending on the particular game being played. For example, a user may require multiple electronic chips to participate in certain games such as roulette or Blackjack. For instance, in Blackjack a user may required multiple electronic chips to enable a split or double-down. In roulette, a user may require multiple electronic chips to place bets on different table locations.

Alternatively or in addition, multiple wagers for a user may be displayed through an output device at a game location. For example, wagers may be displayed using a projection system positioned at the game location. This may enable a user to place multiple wagers while using fewer electronic chips and/or wagering devices.

Alternatively or in addition, the electronic chip 1080 and/or game location may include chip location monitoring systems to allow the position of the chip 1080 to be identified within the game location (e.g. at specific betting locations of a game table, such as numbers of the roulette table). A user may position the electronic chip 1080 at a specified location and select an input button to place a wager associated with that location. The wager can then be received for the user associated with the specific location (as determined by the chip location monitoring system). A user may then re-position the electronic chip 1080 to an additional wagering location to input an additional wager for the same period of play.

The electronic chip 1080 and/or game table may include a wager received indicator that provides an indication (e.g.

a visual indication, an audible noise) that a wager has been received so that the player can be reassured that the wager was received correctly before repositioning the electronic chip 1080.

Game tables can be configured to enable various different type of gameplay and wagering options for use with an electronic chip, including game play specific locations (e.g. double-down, wager locations) and payout and transfer locations (e.g. tip dealer, payout to user account) for example.

Optionally, the wagering device 1390 and/or electronic chip 1080 may be restricted to use at a particular game location. That is, the wagering device 1390 and/or electronic chip 1080 may be usable only when participating in a casino game at the associated game location. This may ensure that the wagering device 1390 and/or electronic chip 1080 are available at the game location when the player volume increases such that increased game capacity is desired. The wagering device 1390 and/or electronic chip 1080 can then include game location data identifying the game location where they are usable (e.g. a visual identifier, an electronic identifier etc.).

Alternatively, the wagering device 1390 and/or electronic chip 1080 may be usable at multiple game locations withing a venue. This may allow a user to easily transfer value between different games at a venue in order participate in different games.

Optionally, the wagering device 1390 can include a projection 1391. A user can tap or press the projection 1391 on the desired wager location to deposit a wager.

Optionally, the projection 1391 can be retractable into the wagering device 1390. For example, the projection 1391 may operate as a wager switch (e.g. an electronic or mechanical switch) to initiate a wager for the player. The player can activate the wager switch by pressing the projection 1391 onto the game table causing the projection 1391 to be retracted into the wagering device 1390. The projection 1391 may be biased to an extended position (e.g. spring-loaded) and may activate the wager switch in response to being moved to a retracted position (e.g. when the wagering device 1390 is pressed onto a table). The location of the wagering device 1390 and projection 1391 can be monitored in order to identify the specific wager being placed by the player when the projection 1391 is depressed.

Optionally, the wager placed by the wagering device 1390 can be selected/adjusted by a user in the same manner as the electronic chip 1080 (e.g. using inputs 1083).

Alternatively, a user can define a wager increment amount for the wagering device 1390 (e.g. in the same manner as the electronic chip 1080). The user can then define a wager by depressing the projection 1391 one or more times at a given wager location to define the wager as: wager=wager increment amount×no. of projection activations. That is, a user can tap the wagering device 1390 on the game table multiple times to define a wager that increases in increments of the wager increment amount to a total defined by the number of taps.

Optionally, the wagering device 1390 may also allow a user to withdraw all or a portion of a wager made using the wagering device 1390. For example, the wagering device 1390 may include a mode-selection input (e.g. a button on the top or side of wagering device 1390). A user can select the mode-selection input to adjust the wagering device 1390 between a place wager mode and a withdraw wager mode. In the withdraw wager mode, a user may withdraw portions of a given wager by tapping the wagering device 1390 on the game table to withdraw the wager in wager increment amount. Alternatively or in addition, a user may withdraw their entire wager through a single tap at the wager location (e.g. through the use of a remove wager button on the wagering device 1390).

The wagers placed using the wagering device 1390 may be shown to players at the game location through one or more display devices. Each wager can be displayed with a player-specific indicator (e.g. a specific color) to allow each user to easily identify and review the wagers they have placed. This can allow users to review their wagers and facilitate adjusting and/or withdrawing their wagers as desired.

The table dealer can also receive standard casino value chips, value assigned color table chips, or cash from a floor player. This data can be input to an electronic device and transferred into the corresponding user account for the floor player. The floor player can then make use of an electronic chip to participate in games at the gaming venue using the values stored in the user's account.

The electronic chip and/or wagering device can also include various safety and tracking features. For example, the electronic chip and/or wagering device can include tracking and/or alarm features to ensure that the location of the chip/device can be monitored. This may help prevent loss or theft of the chip/device and any associated value. For example, the electronic chip and/or wagering device can include location detection systems that monitor the location of the electronic chip/wagering device. The electronic chip and/or wagering device may be configured to cause an alarm to sound (e.g. on the chip itself, or through communication with an external system) if the chip/device is removed from the game venue.

Alternatively or in addition, the electronic chip and/or wagering device can include user-specific security features such as biometric detection features (e.g. a fingerprint scanner). For example, the biometric detection features can be used to ensure that the proper user is setting the wager on the electronic chip 1080 or wagering device 1390 and/or redeeming the electronic chip 1080. For example, a user may be required to scan their fingerprint prior to, or while, setting each wager. This may help prevent tampering by other players.

Optionally, the biometric detection features can be defined when the electronic chip and/or wagering device is acquired by a user. For example, the user may provide a fingerprint calibration input to the electronic chip and/or wagering device when it is acquired to ensure that the electronic chip and/or wagering device is tied to their fingerprint. The biometric detection features may be reset for each user when the electronic chip and/or wagering device is acquired by that user. The controller of the electronic chip and/or wagering device can be configured to prevent a wager value from being defined and/or adjusted prior to authentication of the user.

Alternatively or in addition, the chip control unit can include user-specific security features such as biometric detection features (e.g. a fingerprint scanner) similar to those described for the electronic chip. This can ensure that the operation of the chip control unit is limited to the dealer for the corresponding table.

GAME OPERATIONAL MODES

The following is a description of a multi-mode game system that may be used by itself in any proxy gaming system or in any combination or sub-combination with any other feature or features disclosed herein.

In accordance with this aspect, a proxy device may be operational in one or more operational modes. The operational modes may relate to the manner in which a user controls or operates the proxy device to participate in a game at a game venue.

In a first operational mode, a remote user may participate in a live in-person game using the proxy device via a remote user device (e.g. as described herein above with reference to FIG. 3). In some examples, the remote user may select a proxy device at the time of participating in a game. Alternatively or in addition, a user may submit a request to reserve a proxy device 110 for a specific date and/or time to participate in an in-person game via the proxy device.

In a second operational mode, a user may participate in a live in-person game using the proxy device via a user device while in the vicinity of the game location (e.g. while within the game venue). The second operational mode can proceed in generally the same manner as the first operational mode, except that the user may be located at the gaming venue or even at the gaming table itself.

In the second operational mode, a live player may operate the proxy device to perform any and all functions that may be available to a remote player.

To facilitate use by an in-person player, the proxy device can include input devices enabling a live player to control operations of the proxy device. For example, a user may input commands, provide credit buy-ins, input bets and wagering command inputs directly to the proxy device when the robotic proxy is available and not currently occupied in a gaming session on the proxy gaming platform.

Optionally, the proxy device may include a removable portable input device. The portable input device can be accessed by a live player and used as the user device for that player while at the game venue. The portable input device may be prevented from leaving the venue, e.g. being equipped with location detection systems and alarm or deactivation systems to prevent continued use outside of the venue. The portable input unit can be detachably attached to a proxy device or stored in an accessible storage compartment such as the example input unit storage compartment 753 shown in FIG. 7.

Optionally, the input devices may be used by a live player to piggyback on the play of a remote user.

Optionally, the proxy device may include cash slots and/or credit/debit card slots to enable a user to input value to the proxy device.

In a third operational mode, a user may participate in a live in-person game at the gaming venue after participating in the game using the proxy device. That is, the user may continue participating in a casino game after previously participating in the same game via the proxy device and/or the user may continue participating in the casino game using the proxy device after previously participating in the same game in person.

A user may also transition between operational modes while participating in the same in-person game. This may allow the user to have a substantially continuous gaming experience while in-person at the game venue, at other locations, and/or on route to and from the game venue. This may also enable the user to secure a desired game type, game location, or even seat/machine prior to arriving at the game venue. At the same time, the venue operator can be assured that gaming will still take place at that seat due to the proxy device.

A proxy device that is collapsible and/or includes a seat may be particularly useful in facilitating the third operational mode and/or transitions between operational modes.

Enabling transitions between operational modes can provide a number of advantages to in-person participants. For example, a user may elect to leave the gaming location for personal reasons (e.g. family issues arise or another player at the table is irritating) or due to external factors (e.g. bad weather approaching) while still participating in the game. Maintaining the user's position in the game may also allow a user to continue participating in the game without missing desired actions, such as a progressive jackpot or a favorite number in roulette. Furthermore, this may allow players to leave a gaming location temporarily without losing their seat at a game (e.g. to have a meal, use the washroom, take a call etc.).

While the user is otherwise engaged, the user can direct the proxy device to continue participating in a game e.g. using auto-bet data.

Optionally, a further virtual operational mode may be provided. The virtual operational mode may allow a user to participate in a live in-person game without necessarily requiring the use of a proxy device. For example, the virtual operational mode may be desirable for a user to participate in a casino game in-person, but while there is no more room at the table and/or no more remaining chips at the table. In such circumstances, a user may interact with a user device 120 such as tablet 900 to place wagers using virtual chips. Such wagers may be shown only to the user and/or they can be displayed using a proxy device and/or display using a table display device.

As shown in FIG. 9, the user device 900 can provide a user interface that allows a user to participate in a live casino game while placing wagers through the user device 900. The user device 900 may enable to place wagers directly at a game location, with such wagers being displayed using a display or projection at the game location. As shown in FIG. 9, the user interface To further enable a virtual operational mode, a game location may provide users with access to location-specific user devices. The location-specific user devices can be generally similar to the user devices 120, except that they may provide functionality tied to a specific game location. For example, the location-specific user devices may be limited to participation in games ongoing at the corresponding game location.

Optionally, a user device and/or location-specific user device may allow a user to input value. For example, a location-specific user device may be equipped with a credit/debit card payment unit to enable a user to load value using their credit/debit card. Alternatively or in addition, a user may input value digital, e.g. through a smartphone and/or by accessing a user account over the Internet.

As used herein, the wording "and/or" is intended to represent an inclusive—or. That is, "X and/or Y" is intended to mean X or Y or both, for example. As a further example, "X, Y, and/or Z" is intended to mean X or Y or Z or any combination thereof.

While the above description describes features of example embodiments, it will be appreciated that some features and/or functions of the described embodiments are susceptible to modification without departing from the spirit and principles of operation of the described embodiments. For example, the various characteristics which are described by means of the represented embodiments or examples may be selectively combined with each other. Accordingly, what has been described above is intended to be illustrative of the claimed concept and non-limiting. It will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

I claim:

1. A system for enabling remote participation in a live in-person game occurring at a game venue, the system comprising:
a proxy device located at the game venue; and
one or more servers communicatively coupled to the proxy device and to a user device;
wherein
the proxy device is positionable at a gaming location within the game venue;
the one or more servers is configured to:
receive control data from the user device;
transmit the control data to the proxy device; and
the proxy device is configured to participate in the game at the gaming location in response to the control data thereby enabling a user associated with the user device to participate in the game; and
wherein
the proxy device is further configured to:
acquire environment data relating to an environment of the game venue; and
transmit the environment data to the one or more servers; and
the one or more servers is configured to transmit the environment data to the user device, wherein the environment data is usable by the user device to generate an environment output representative of the environment of the game venue.

2. The system of claim 1, wherein the control data comprises wager data, and the proxy device is configured to make a wager in the game in response to the wager data.

3. The system of claim 1, wherein
the proxy device is configured to:
acquire game data relating to a status of the game; and
transmit the game data to the one or more servers; and
the one or more servers is configured to transmit the game data to the user device, wherein the game data is usable by the user device to generate a status output representative of the status of the game.

4. The system of claim 3, wherein the game data includes user-specific data not visible to any other players participating in the game.

5. The system of claim 3, wherein the game data includes participant wager data for one or more live players participating live in the game at the game venue.

6. The system of claim 3, wherein the game data includes dealer data representing an instruction provided by the dealer of the game.

7. The system of claim 6, wherein the proxy device is configured to
identify a specified action performed by the dealer of the game; and
generate the dealer data automatically in response to identifying the specified action.

8. The system of claim 7, wherein the specified action corresponds to a no more bets indication, and the one or more servers is configured to prevent the user from submitting any further wagers in response to identifying the no more bets indication.

9. The system of claim 1, wherein the user device is operable to mute at least some of the environment data acquired by the proxy device.

10. The system of claim 1, wherein the user device is located at the game venue.

11. The system of claim 1, wherein the user device is located at a remote user location that is external to the game venue.

12. The system of claim 1, wherein the game venue is a casino, and the game is a casino game.

13. The system of claim 1, wherein the proxy device and the one or more servers communicate over a local private network.

14. The system of claim 1, wherein the one or more servers and the user device communicate over the local private network.

15. The system of claim 1, wherein the one or more servers and the user device communicate at least partially using a public network.

16. The system of claim 1, wherein the one or more servers is configured to authenticate the user prior to enabling the user device to control the proxy device to participate in the game.

17. The system of claim 16, wherein the one or more servers is configured to continually authenticate the user while the game is ongoing to enable the user device to continue to control the proxy device.

18. A system for enabling remote participation in a live in-person game occurring at a game venue, the system comprising:
a proxy device located at the game venue; and
one or more servers communicatively coupled to the proxy device and to a user device;
wherein
the proxy device is positionable at a gaming location within the game venue;
the one or more servers is configured to:
receive control data from the user device; and
transmit the control data to the proxy device;
the proxy device is configured to participate in the game at the gaming location in response to the control data thereby enabling a user associated with the user device to participate in the game; and
the one or more servers is configured to:
receive additional wager data from an additional user device, the additional user device corresponding to an additional user; and
transmit the additional wager data to the proxy device; and
the proxy device is configured to make an additional piggyback wager in the game in response to the additional wager data thereby enabling the additional user to participate in the game by piggybacking on the participation of the user device.

19. A system for enabling remote participation in a live in-person game occurring at a game venue, the system comprising:
a proxy device located at the game venue; and
one or more servers communicatively coupled to the proxy device and to a user device;
wherein
the proxy device is positionable at a gaming location within the game venue;
the one or more servers is configured to:
receive control data from the user device; and
transmit the control data to the proxy device;
the proxy device is configured to participate in the game at the gaming location in response to the control data thereby enabling a user associated with the user device to participate in the game; and the one or more servers is configured to:

receive auto-bet data from the user device; and transmit the auto-bet data to the proxy device; and the proxy device is configured to make a plurality of automated wagers in the game in response to the auto-bet data.

20. The system of claim 19, wherein the auto-bet data defines a user-specified set of wagering rules, and the proxy device is configured to make the automated wagers according to the user-specified set of wagering rules in the absence of additional instructions.

* * * * *